United States Patent
Averbuch et al.

(10) Patent No.: US 7,085,401 B2
(45) Date of Patent: Aug. 1, 2006

(54) AUTOMATIC OBJECT EXTRACTION

(75) Inventors: Amir Averbuch, Jaffa (IL); Ofer Miller, Oranit (IL)

(73) Assignee: Infowrap Systems Ltd., Jaffa (IL)

(*) Notice: Subject to any disclaimer, the term of this patent is extended or adjusted under 35 U.S.C. 154(b) by 934 days.

(21) Appl. No.: 09/984,757

(22) Filed: Oct. 31, 2001

(65) Prior Publication Data

US 2003/0081836 A1    May 1, 2003

(51) Int. Cl.
*G06K 9/00* (2006.01)

(52) U.S. Cl. ........................ 382/103; 382/199

(58) Field of Classification Search ............ 382/103, 382/173, 236, 291; 348/169
See application file for complete search history.

(56) References Cited

U.S. PATENT DOCUMENTS 5,592,228 A * 1/1997 Dachiku et al. ......... 348/416.1
6,301,385 B1 * 10/2001 Chen et al. ................ 382/173
6,785,329 B1 * 8/2004 Pan et al. .............. 375/240.08

OTHER PUBLICATIONS le Roux et al. "An Overview of Moving Object Segmentation in Video Images." Proc. South African Symp. on Communications and Signal Processing, Aug. 30, 1991, pp. 53-57.*
Mech et al. "A Noise Robust Method for Segmentation of Moving Objects in Video Sequences." IEEE Int. Conf. on Acoustics, Speech, and Signal Processing, vol. 4, Apr. 21, 1997, pp. 2657-2660.*
Kim et al. "A Fast and Robust Moving Object Segmentation in Video Sequences." Proc. Int. Conf. on Image Processing, vol. 2, Oct. 24, 1999, pp. 131-134.*
Toth et al. "Illumination-invariant Change Detection." Proc. 4th IEEE Southwest Symp. on Image Analysis and Interpretation, Apr. 2, 2000, pp. 3-7.*

(Continued)

*Primary Examiner*—Samir Ahmed
*Assistant Examiner*—Charles Kim

(57) ABSTRACT

A method for automatic, stable and robust object extraction of moving objects in color video frames, achieved without any prior knowledge of the video content. For high rate video, the method includes providing at least a first and a second high frame rate video frames, performing a reciprocal illumination correction of the first and second video frames to yield respective first and second smoothed frames, performing a change detection operation between the first and second smoothed frames to obtain a difference image, and performing a local adaptive thresholding operation on the difference image to generate a binary image containing extracted objects, the local thresholding operation using a weight test to determine a boundary of each of the extracted objects. For an extracted object with a fragmented boundary, the method further comprises re-unifying the boundary. For low rate video, additional steps include: an edge correction applied on the first image to yield a first edge-corrected image, a global thresholding applied to the first edge-corrected image to yield a first binary edge image, and an ANDing operation on the difference image and the first binary edge image to generate a second binary image which is fed to the local adaptive thresholding operation.

25 Claims, 9 Drawing Sheets

OTHER PUBLICATIONS

Jinzenji et al. "Automatic Two-Layer Video Object Plane Generation Scheme and Its Application to MPEG-4 Video Coding." Proc. 2000 IEEE Int. Symposium on Circuits and Systems, vol. 3, May 28, 2000, pp. 606-609.*

Tancharoen et al. "Object Segmentation Based on Multiple Features for Low Bit Rate Video Coding." Proc. 5th Int. Conf. on Signal Processing, vol. 2, Aug. 21, 2000, pp. 975-978.*

* cited by examiner

| 1 | 2 | 2 | 1 | 1 | 1 | 1 | 1 | 1 | 1 | 2 | 3 |
|---|---|---|---|---|---|---|---|---|---|---|---|
| 45 | 56 | 81 | 255 | 67 | 45 | 40 | 25 | 19 | 18 | 20 | 8 |
| 2 | 3 | 9 | 5 | 78 | 78 | 50 | 54 | 23 | 18 | 26 | 9 |
| 4 | 19 | 18 | 14 | 70 | 57 | 180 | 200 | 28 | 13 | 6 | 9 |
| 3 | 10 | 18 | 18 | 67 | 56 | 255 | 91 | 36 | 18 | 9 | 10 |
| 5 | 50 | 60 | 67 | 53 | 90 | 254 | 240 | 230 | 33 | 3 | 30 |
| 190 | 210 | 200 | 34 | 64 | 45 | 79 | 91 | 185 | 29 | 8 | 6 |
| 45 | 45 | 56 | 67 | 67 | 89 | 89 | 49 | 50 | 50 | 50 | 50 |
| 78 | 89 | 90 | 100 | 130 | 90 | 78 | 79 | 170 | 190 | 80 | 90 |
| 22 | 27 | 20 | 28 | 28 | 27 | 72 | 90 | 130 | 130 | 70 | 29 |
| 19 | 16 | 17 | 18 | 19 | 13 | 7 | 9 | 7 | 19 | 19 | 19 |
| 4 | 5 | 7 | 9 | 2 | 5 | 9 | 11 | 13 | 14 | 15 | 17 |

FIG. 2

AUTOMATIC OBJECT EXTRACTION

FIELD AND BACKGROUND OF THE INVENTION

The term image segmentation refers to the partition of an image into a set of non-overlapping regions that cover it. An object is composed of one or more segments, and the term image segmentation is thus closely associated with "object extraction". The definition of the latter being well known. Image segmentation is probably one of the most important low-level techniques in vision, since virtually any computer vision algorithm incorporates some sort of segmentation. In general, a segmentation is classified as groups of pixels that have common similarities. The properties of a good image segmentation are defined as follows: regions of segments in the image segmentation should be uniform and homogeneous with respect to some characteristic such as gray tone or texture. Region interiors should be simple and without many small holes. Adjacent regions should have significantly different values with respect to the characteristic on which they are uniform. Boundaries of each segment should be simple, not ragged, and must be spatially accurate.

The motivation for the use of image segmentation as a preliminary stage for image analysis lies in the desire to transform the given image into a more compact and coherent representation, which emphasizes similar properties (attributes) of the image. We will partition the image into a number of segments, and then classify each segment as static or moving (in a video sequence) according to its relevant properties.

Existing Segmentation Algorithms

Traditional video standards such as MPEG-1, MPEG-2, H.261 or H.263 are low-level techniques in the sense that no segmentation or analysis of the scene is required. They can achieve high compression ratios, and are suitable for a wide range of applications. However, the increasing demands by multimedia applications and content-based interactivity, dictate the need to have new video coding schemes that are content-based.

The new video coding standard MPEG-4 (T. Sikora, IEEE Trans. on Circuits and Syst. for Video Technol., 7, 19–31, 1997) is a trigger and source for the development of many segmentation algorithms. MPEG-4 takes advantage of a prior decomposition of sequential video frames into video object planes (VOPs) so that each VOP represents one moving object. Each frame of the input sequence is segmented into arbitrarily shaped image regions (i.e. VOPs) such that each VOP describes one semantically meaningful object or video content of interest. A video object layer is assigned to each VOP, containing shape, motion and texture information. The following summarizes some of the most important motion segmentation and VOP generation techniques that have been proposed to date.

Decomposing a video sequence into VOPs is a very difficult task, and comparatively little research has been undertaken in this field. An intrinsic problem of VOP generation is that objects of interest are not homogeneous with respect to low-level features such as color, intensity, or optical flow. Thus, conventional segmentation algorithms will fail to obtain meaningful partitions. In addition to the many research papers and scientific activities reported below, many books were written on the subject, for example: P. Kuhn, "*Algorithms, Complexity Analysis and VLSI Architectures for MPEG-4 Motion Estimation*", Kluwer Academic Publishers, 1999; I-Jong Lin and S. Y. Kung, "*Video Object Extraction and Representation: Theory and application*", Kluwer Academic Publishers, 2000; K. N. Ngan, T. Meier and D. Chai, "*Advanced Video Coding Principles and Techniques*", Elsevier 1999; A. Puri and T. Chen (Editors), "*Multimedia Systems, Standards, and Networks*", Marcel Dekker, 2000; G. Tziritas and C. Labit, "*Motion Analysis for Image Sequence*", Elsevier, 1994) to name a few.

Motion as a Source for Segmentation

Moving objects are often characterized by a coherent motion that is distinct from that of the background. This makes motion a very useful feature for segmenting video sequences. It can complement other features such as color, intensity, or edges that are commonly used for segmentation of still images. Usually, motion is needed for classification, therefore, the term motion has to be defined. Lets denote by $I(x,y;k)$ the intensity or luminance of pixel $(x,y)$ in frame k. Following the definitions in (A. M. Tekalp, Ed., *Digital Video Processing*, Prentice-Hall, 1995), we have to distinguish between two-dimensional (2-D) apparent motion and static objects. The projection of the three-dimensional (3-D) motion onto the image plane is referred to as 2-D motion. It is the true motion that we would like to automatically detect. On the other hand, apparent motion is what we perceive as motion, and it is induced by temporal changes in the image intensity $I(x,y,k)$. Apparent motion can be characterized by a correspondence vector field, or by an optical flow field. A correspondence vector describes the displacement of a pixel between two frames, whereas the optical flow $(u,v)$ at pixel $(x,y;k)$ refers to a velocity and is defined as $$(u, v) = \left(\frac{\partial x}{\partial t}, \frac{\partial y}{\partial t}\right) \qquad (1)$$

The optical flow and correspondence vectors are related. From Eq. (1) it can also be seen that apparent motion is highly sensitive to noise because of the derivatives, which can cause largely incorrect results. Furthermore, moving objects or regions must contain sufficient texture to generate optical flow, because the luminance in the interior of moving regions with uniform intensity remains constant. Unfortunately, we can only observe apparent motion.

Motion Estimation

In addition to the difficulties mentioned above, motion estimation algorithms have to solve the so-called occlusion and aperture problems. The occlusion problem refers to the fact that no correspondence vectors exist for covered and uncovered background. To illustrate the aperture problem, we first introduce the optical flow constraint (OFC). The OFC assumes that the intensity remains constant along the motion trajectory (A. M. Tekalp, Ed., Prentice-Hall, 1995), i.e., $$\frac{d}{dx}I(x, y; k) = \qquad (2)$$
$$\frac{\partial I}{\partial x} \cdot \frac{\partial x}{\partial t} + \frac{\partial I}{\partial y} \cdot \frac{\partial y}{\partial t} + \frac{\partial I}{\partial t} = \langle \nabla I, (u, v)\rangle + \frac{\partial I}{\partial t} = 0$$

where $\langle \cdot, \cdot \rangle$ denote the vector inner product. The aperture problem states that the number of unknowns is larger than the number of observations. From the optical flow constraint Eq. (2) it follows that only the flow component in the direction of the gradient ∇I, the so-called normal flow, can be estimated. The orthogonal component can take on any value without changing the inner product, and is therefore not defined. Thus, additional assumptions are necessary to obtain a unique solution. These usually impose some smoothness constraints on the optical flow field to achieve continuity.

There are two ways of describing motion fields:

1. Nonparametric representation, in which a dense field is estimated where each pixel is assigned a correspondence or flow vector. Block matching is then applied, where the current frame is subdivided into blocks of equal size, and for each block the best match in the next (or previous) frame is computed. All pixels of a block are assumed to undergo the same translation, and are assigned the same correspondence vector. The selection of the block size is crucial. Block matching is unable to cope with rotations and deformations. Nevertheless, their simplicity and relative robustness make it a popular technique. Nonparametric representations are not suitable for segmentation, because an object moving in the 3-D space generates a spatially varying 2-D motion field even within the same region, except for the simple case of pure translation. This is the reason why parametric models are commonly used in segmentation algorithms. However, dense field estimation is often the first step in calculating the model parameters.

2. Parametric models require a segmentation of the scene, which is our ultimate goal, and describe the motion of each region by a set of a few parameters. The motion vectors can then be synthesized from these model parameters. A parametric representation is more compact than a dense field description, and less sensitive to noise, because many pixels are treated jointly to estimate a few parameters.

In order to derive a model or transformation that describes the motion of pixels between successive frames, assumptions on the scene and objects have to be made. Let (X,Y,Z) and (X',Y',Z') denote the 3-D coordinates of an object point in frame k and k+1, respectively. The corresponding image plane coordinates are (x,y) and (x',y'). If a 3-D object undergoes translation, rotation and linear deformation, the 3-D displacement of a point on the object is given in (G. Wolberg, "*Digital Image Warping*". IEEE, 1984)

$$\begin{pmatrix} X' \\ Y' \\ Z' \end{pmatrix} = \begin{pmatrix} s_{11} & s_{12} & s_{13} \\ s_{21} & s_{22} & s_{23} \\ s_{31} & s_{32} & s_{33} \end{pmatrix} \cdot \begin{pmatrix} X \\ Y \\ Z \end{pmatrix} + \begin{pmatrix} t_1 \\ t_2 \\ t_3 \end{pmatrix} \qquad (3)$$

It is very common to model 3-D objects by (piecewise) planar patches whose points satisfy $$aX+bY+cZ=1. \qquad (4)$$

If such a planar object is moving according to Eq. (3), the affine motion model is obtained under orthographic (parallel) projection, and the eight-parameter model under perspective (central) projection.

The 3-D coordinates are related to the image plane coordinates under the orthographic projection by $$(x,y)=(X,Y) \text{ and } (x',y')=(X',Y') \qquad (5)$$

This projection is computationally efficient and provides a good approximation, if the distance between the objects and the camera is large compared to the depth of the objects. From Eqs. (3)–(5), it follows that $$x'=a_1x+a_2y+a_3$$
$$y'=a_4x+a_5y+a_6 \qquad (6)$$

which is known as the affine model. In the case of the more realistic perspective projection, we get $$(x, y) = \left(f\frac{X}{Z}, f\frac{Y}{Z}\right) \text{ and } (x', y') = \left(f\frac{X'}{Z'}, f\frac{Y'}{Z'}\right). \qquad (7)$$

Together with Eqs. (3) and (4), this results in the eight-parameter model $$x' = \frac{a_1x + a_2y + a_3}{a_7x + a_8y + 1} \quad y' = \frac{a_4x + a_5y + a_6}{a_7x + a_8y + 1} \qquad (8)$$

Both the affine and the eight-parameter model are very popular, however many other transformations exist depending on the assumption made.

Parametric models describe each region by one set of parameters that is either estimated by fitting a model in the least squares sense to a dense motion field obtained by a nonparametric method, or directly from the luminance signal I(x,y:k) as in M. Hotter and R. Thoma, Signal Processing, vol. 15, no. 3, pp. 315–334, 1988, and H. G. Musmann, M. Hotter, and J. Ostermann, Signal Processing: Image Commun., vol. 1, pp. 117–138, 1989. Although parametric representations are less noise sensitive, they still suffer from the intrinsic problems of motion estimation. One has to be careful when interpreting an estimated flow field. Most likely, it is necessary to include additional information such as color or intensity, to accurately and reliably detect boundaries of moving objects.

Motion Segmentation

A classical approach to motion segmentation is to estimate a motion field, followed by a segmentation of the scene based only on this motion information (see G. Adiv, IEEE Trans. PAMI, PAMI-7, 384–401, 1985; M. Hotter and R. Thoma, Signal Processing, vol. 15, no. 3, pp. 315–334, 1988; and M. M. Chang, A. M. Tekalp and M. I. Sezan, IEEE Int. Conf. Acoust. Speech, Signal Processing, ICASSP93, Minneapolis, Minn., V, 33–36, 1993). Adiv proposes a hierarchically structured two-stage algorithm. The flow field is first segmented into connected components using the Hough transform, such that the motion of each component can be modeled by an affine transformation (Eq. 6). Adjacent components are then merged into segments if they obey the same 8-parameter quadratic motion model. In the second stage, neighboring segments that are consistent with the same 3-D motion (Eq. 3) are combined, resulting in the final segmentation.

The Bayesian framework is popular among the methods that achieve motion segmentation. There are a number of references that detail it including: P. Bouthemy and E. Francois, Int. J. Comput. Vision, 10:2, pp. 157–182, 1993; Chang et al. 1993 (see above); M. M. Chang, M. I. Sezan and A. M Tekalp, ICASSP94, pp. 221–234, 1994; D. W. Murray and B. F. Buxton, IEEE PAMI, PAMI-9, pp. 220–228, 1987; and C. Stiller, ICASSP93, pp. 193–196, 1993, and in IEEE Trans. Image Processing, 6, pp. 234–250, 1997. The key idea is to find the maximum a posteriori (MAP) estimate of the segmentation X for some given observation O, i.e. to maximize $P(X|O) < P(O|X)P(X)$. Murray and Buxton used an estimated flow field as the observation O. The segmentation or prior model X is assumed to be a sample of a Markov random field (MRF) to enforce continuity of the segmentation labels, and thus $P(X)$ is a Gibbs distribution. The energy function of the MRF consists of a spatial smoothness term, a temporal continuity term, and a line field as in D. Geman and D. Geman, IEEE PAMI, PAMI-6, 721–741, 1984, to allow for motion discontinuities. To define the observation model $P(O|X)$, the parameters of a quadratic flow model (G. Adiv, IEEE Trans. PAMI, PAMI-7, 384–401, 1985) are calculated for each region by linear regression. The resulting probability function $P(O|X)P(X)$ is maximized by simulated annealing (Geman and Geman, above). The major drawbacks of this proposal are the computational complexity, and the need to specify the number of objects likely to be found. A similar approach was taken by Bouthemy and Francois, above. The energy function of their MRF consists only of a spatial smoothness term. The observation contains the temporal and spatial gradients of the intensity function, which is essentially the same information as the optical flow due to the OFC (Eq. 2). For each region, the affine motion parameters (Eq. 6) are computed in the least-squares sense, and $P(O|X)$ models the deviation of this synthesized flow from the optical flow constraint (Eq. 2) by zero-mean white Gaussian noise. The optimization is performed by iterated conditional modes (ICM) (J. Besag, J. Royal Statist. Soc. B, vol. 48, no. 3, pp. 259–279, 1986), which is faster than simulated annealing, but likely to get trapped in a local minimum. To achieve temporal continuity, the segmentation result of the previous frame is used as an initial estimate for the current frame. The algorithm then alternates between updating the segmentation labels X, estimating the affine motion parameters, and updating the number of regions in the scene.

The techniques of Adiv, Bouthemy and Francois, and Murray and Buxton, include only optical flow data into the segmentation decision, and hence, their performance is limited by the accuracy of the estimated flow field. In contrast, Chang et al., ICASSP93, 1993 incorporated intensity information into the observation O. The energy function of the MRF includes a spatial continuity term and a motion-compensated temporal term to enforce temporal continuity. Two methods to generate a synthesized flow field for each region were proposed: the eight-parameter quadratic model of Adiv, and the mean flow vector of the region calculated from the given field in O. For the conditional probability $P(O|X)$ it is assumed that both the deviation of the observed flow from the synthesized flow, and the difference between the gray level of a pixel and the mean gray level of the region it belongs to, obey zero-mean Gaussian distributions. By controlling the variances of these two distributions, more weight is put on the flow data in the case where it is reliable, i.e., for small values of the displaced frame difference (DFD), and more weight on the intensity in areas with unreliable flow data. The optimization is then performed by ICM as done by Bouthemy and Francois. These results are not good since we get over-segmentation, and the method is computationally expensive.

It is possible to treat motion estimation and segmentation jointly in the Bayesian framework (see for example Chang et al., ICASSP94, 1994; Stiller, ICASSP93, 1993 and Stiller, IEEE Trans. Image Processing, 6, 234–250, 1997). In this case, the observation O consists only of the gray-level intensity, and both the segmentation and the motion field have to be estimated. Chang et. al. ICASSP94, 1994, used both a parametric and a dense correspondence field representation of the motion, with the parameters of the eight parameter-model (Eq. 8) being obtained in the least squares sense from the dense field. These approaches suffer from high computational complexity, and many algorithms need the number of objects or regions in the scene as an input parameter.

In the technique proposed by C. Stiller, IEEE Int. Conf. Acoust. Speech, Signal Processing, ICASSP93, Minneapolis, Minn., V, 193–196, 1993, the objective function consists of two terms. The DFD generated by the dense motion field is modeled by a zero-mean generalized Gaussian distribution, and an MRF ensures segment wise smoothness of the motion field, and spatial continuity of the segmentation. In C. Stiller, IEEE Trans. Image Processing, 6, 234–250, 1997, the DFD is also assumed to obey a zero-mean generalized Gaussian distribution; however, occluded regions are detected, and no correspondence is required for them.

Techniques that make use of Bayesian inference and model images by Markov random fields are more plausible than some rather ad-hoc methods. They can also easily incorporate mechanisms to achieve spatial and temporal continuity. On the other hand, these approaches suffer from high computational complexity, and many algorithms need the number of objects or regions in the scene as an input parameter.

Hierarchically structured segmentation algorithms were proposed (M. Hotter and R. Thoma, Signal Processing, vol. 15, no. 3, pp. 315–334, 1988; Musmann, M. Hotter, and J. Ostermann, Signal Processing: Image Commun., vol. 1, pp. 117–138, 1989; N. Diehl, Signal Processing: Image Commun., vol. 3, pp. 23–56, 1991). A change detector divides the current frame into changed and unchanged regions, and each connected changed region is assumed to correspond to one object. Starting from the largest changed region, the motion parameters for this object are estimated directly from the spatio-temporal image intensity and gradient. If the prediction error after motion compensation is too large, this object is further subdivided and analyzed in subsequent levels of hierarchy. The algorithm sequentially refines the segmentation and motion estimation, until all changed regions are accurately compensated. Because these techniques alternate between analyzing the image and synthesizing, they have been described as object-oriented analysis-synthesis algorithms. In Hotter and Thoma, and in Musmann, Hotter and Ostermann, the eight-parameter motion model (Eq. 8) is used, and the parameters are obtained by a direct method. The luminance function is approximated by a Taylor series expansion, so that the frame difference can be expressed in terms of spatial intensity gradients and the unknown parameters. Both frame differences and gradients are easy to compute, and the model parameters are obtained by linear regression. A 12-parameter quadratic motion model that describes a parabolic surface undergoing the 3-D motion (Eq. 3) under parallel projection is proposed by Diehl. An iterative technique that is similar to the Newton-Raphson algorithm, estimates the parameters by minimizing the MSE between the motion-compensated and the current frame. Edge information is incorporated into the segmentation algorithm to improve the accuracy of boundaries.

Morphological tools such as the watershed algorithm and simplification filters are becoming increasingly popular for segmentation and coding (J. G. Choi, S. W. Lee, and S. D. Kim, IEEE Trans. Circuits Syst. Video Technol., vol. 7, pp. 279–286, 1997; F. Marques and C. Molina, in SPIE Visual Commun. Image Processing, VCIP'97, San Jose, Calif., vol. 3024, pp. 190–199, 1997; F. Meyer and S. Beucher, J. Visual Commun. Image Representation, vol. 1, pp. 21–46, September 1990; P. Salembier and M. Pardas, IEEE Trans. Image Processing, vol. 3, pp. 639–651, 1994; P. Salembier, P. Brigger, J. R. Casas, and M. Pardas, IEEE Trans. Image Processing, vol. 5, pp. 881–898, 1996). An introduction, discussion of potential problems, and several applications to segmentation are presented by. Meyer and Beucher. Salembier and Pardas describe a segmentation algorithm that has a typical structure for morphological approaches. In a first step, the image is simplified by the morphological filter "open-close by reconstruction", to remove small dark and bright patches. The size of these patches depends on the structuring element used. The color or intensity of the resulting simplified images is relatively homogeneous. An attractive property of these filters is that they do not blur or change contours like low-pass or median filters. The following marker extraction step detects the presence of homogeneous areas, for example, by identifying large regions of constant color or luminance. This step often contains most of the know-how of the algorithm. Each extracted marker is then the seed for a region in the final segmentation. Undecided pixels are assigned a label in the decision step, the so-called watershed algorithm, which is a technique similar to region growing. The watershed algorithm is well defined and can be efficiently implemented by hierarchical FIFO queues. A quality estimation is performed in Salembier and Pardas as a last step to determine which regions require resegmentation. The proposed segmentation by Salembier et al., 1996, above, is very similar, but an additional projection step is incorporated that warps the previous partition onto the current frame. This projection, which is also computed by the watershed algorithm, ensures temporal continuity and linking of the segmentation. The result is an over-segmentation.

The segmentation algorithms in Meyer and Beucher, Salembier and Pardas 1994, and Salembier, Brigger, Casas, and Pardas, 1996, are not true video segmentation techniques. They consider video sequences to be 3-D signals and extend conventional 2-D methods, although the time axis does not play the same role as the two spatial axes. A morphological video segmentation algorithm was proposed by G. Choi, S. W. Lee, and S. D. Kim, IEEE Trans. Circuits Syst. Video Technol., vol. 7, pp. 279–286, 1997. Their marker extraction step detects areas that are not only homogeneous in luminance, but also in motion, so-called joint markers. For that, intensity markers are extracted as in Salembier and M. Pardas, 1994, and affine motion parameters (Eq. 6) are calculated for each marker by linear regression from a dense flow field. Intensity markers for which the affine model is not accurate enough are split into smaller markers that are homogeneous. As a result, multiple joint markers might be obtained from a single intensity marker. The watershed algorithm also uses a joint similarity measure that incorporates luminance and motion. In a last stage, the segmentation is simplified by merging regions with similar affine motions. A drawback of this technique is the lack of temporal correspondence to enforce continuity in time.

Morphological segmentation techniques are computationally efficient, and there is no need to specify the number of objects as with some Bayesian approaches, because this is determined automatically by the marker or feature extraction step. However, due to its nature, the watershed algorithm suffers from the problems associated with region-growth techniques.

The algorithms described so far are mainly focused on coding. They segment video sequences into regions that are homogeneous with respect to motion and possibly color or luminance. For content-based functionalities as in MPEG-4, we would like to partition the frames into objects that are semantically meaningful to the human observer. Thus, the above techniques will fail in many practical situations where objects do not correspond to partitions based on simple features like motion or color. Segmentation algorithms that specifically address VOP generation have been proposed, many of them just recently with the development of the new video coding standard MPEG-4 (F. Marques and C. Molina, 1997; R. Mech and M. Wollbom, in IEEE Int. Conf. Acoust., Speech, Signal Processing, ICASSP'97, Munich, Germany, vol. 4, pp. 2657–2660, 1997; T. Meier and K. N. Ngan in ISO/IEC JTC1/SC29/WG11 MPEG97/m2238, Stockholm, Sweden, 1997; A. Neri, S. Colonnese, G. Russo, and P. Talone, Signal Processing, vol. 66, no. 2, pp. 219–232, 1998; and J. Y. A. Wang and E. H. Adelson, IEEE Trans. Image Processing, vol. 3, pp. 625–638, 1994).

Wang and Adelson, 1994, proposed a layered representation of image sequences that corresponds to the VOP technique used by MPEG-4. The current frame is segmented based on motion with each object or layer being modeled by an affine transformation (6). The algorithm starts by estimating the optical flow field, and then subdivides the frame into square blocks. The affine motion parameters are computed for each block by linear regression to get an initial set of motion hypotheses. The pixels are then grouped by an iterative adaptive K-means clustering algorithm. Pixel (x,y) is assigned to hypothesis or layer i if the difference between the optical flow at (x,y) and the flow vector synthesized from the affine parameters of layer i is smaller than for any other hypothesis. To construct the layers, the information of a longer sequence is necessary. The frames are warped according to the affine motion of the layers such that coherently moving objects are aligned. A temporal median filter is then applied to obtain a single representative image for each object. This proposal has several disadvantages. If in a sequence different views of the same object are shown, it is not possible to represent that object by a single image that is warped from frame to frame. Further, the affine transformation (6) might not be able to describe the motion of a complete layer in the presence of strongly non-rigid motion such as a person walking. The algorithm also depends completely on the accuracy of the optical flow estimates since no color or intensity information is used. Finally, the layer construction process makes real-time execution impossible, because a longer sequence of frames is required.

A double-partition approach based on morphology was suggested by Marques and Molina, 1997. Initially, objects of interest have to be selected interactively, leading to a partition at object level that corresponds to a decomposition into video object planes. These objects are normally not homogeneous in color or motion and are resegmented to obtain a fine partition that is spatially homogeneous. After estimating a dense motion field by block matching, the fine partition is projected onto the next frame using motion compensation. These projected regions are used to extract the markers for the next frame, which is then segmented by the watershed algorithm based on luminance. To improve the temporal stability, the segmentation process is guided by a change detection masks that prevents markers of static areas to overgrow moving areas and vice versa. Finally, the new object level partition is computed from the projected and segmented fine partition, whereby the algorithm must keep track of the labels of each region to know the correspondence between fine regions and objects. This is not fully automatic and some manual selection should be done in the beginning.

Automatic segmentation is formulated by Neri et al. 1998, as the problem of separating moving objects from a static background. In a preliminary stage, potential foreground regions are detected by applying a higher order statistics (HOS) test to a group of interframe differences. The nonzero values in the difference frames are either due to noise or moving objects, with the noise being assumed to be Gaussian in contrast to the moving objects, which are highly structured. In the case of moving background, the frames must first be aligned by motion compensation. For all difference frames, the zero-lag fourth-order moments are calculated because of their capability to suppress Gaussian noise. These moments are then thresholded, resulting in a preliminary segmentation map containing moving objects and uncovered background. To identify uncovered background, the motion analysis stage calculates the displacement of pixels that are marked as changed. The displacement is estimated at different lags from the fourth-order moment maps by block matching. If the displacement of a pixel is zero for all lags, it is classified as background and as foreground otherwise. Finally, the regularization phase applies morphological opening and closing operators to achieve spatial continuity and to remove small holes inside moving objects of the segmentation map. The resulting segmented foreground objects are slightly too large, because the boundary location is not directly determined from the gray level or edge image. A version of this technique is currently under investigation in the ISO MPEG-4 N2 Core Experiment on Automatic Segmentation Techniques (S. Colonnese, U. Mascia, G. Russo, and P. Talone, in ISO/IEC JTC1/SC29/WG11 MPEG97/m2365, Stockholm, Sweden, July 1997). It has a postprocessor incorporated to improve the boundary location by adjusting the boundaries to spatial edges. It is not accurate and the segments are too big.

Mech and Wollbom, 1997, generate the video object plane or object mask from an estimated change detection mask (CDM). Initially, a change detection mask is generated by taking the difference between two successive frames using a global threshold. This CDM is then refined in an iterative relaxation that uses a locally adaptive threshold to enforce spatial continuity. Temporal stability is increased by incorporating a memory such that each pixel is labeled as changed if it belonged to an object at least once in the last change detection masks. The simplification step includes a morphological close and removes small regions to obtain the final CDM. The object mask is calculated from the CDM by eliminating uncovered background and adapting to gray-level edges to improve the location of boundaries. A version of this algorithm is also part of the ISO MPEG-4 N2 Core Experiment (R. Mech and P. Gerken, in ISO/IEC JTC1/SC29/WG11 MPEG97/m1949, Bristol, U.K. 1997. It contains an additional scene change or cut detector, a global motion estimation and compensation step based on the eight-parameter model (8), and the memory length has been made adaptive.

While the two proposals (S. Colonnese, U. Mascia, G. Russo, and P. Talone, in ISO/IEC JTC1/SC29/WG11 MPEG97/m2365, 1997, and Mech and Gerken /m1949) to the ISO MPEG-4 N2 Core Experiment perform segmentation mainly based on temporal information, J. G. Choi, M. Kim, M. H. Lee, and C. Ahn, in ISO/IEC JTC1/SC29/WG11 MPEG97/m2091, Bristol, U.K., April 1997, presented a spatial morphological segmentation technique. It starts with a global motion estimation and compensation step. The global affine motion parameters (6) are calculated from the correspondence field, which is obtained by a block-matching algorithm. After that, the presence of a scene cut is examined. Then, the actual segmentation commences by simplifying the frame with a morphological open-close by reconstruction filter. The thresholded morphological gradient image, calculated from the luminance and chrominance components of the frame, serves as input for the watershed algorithm that detects the location of the object boundaries. To avoid over-segmentation, regions smaller than a threshold are merged with their neighbors. Finally, a foreground/background decision is made to create the video object planes. Every region for which more than half of its pixels are marked as changed in a change detection mask is assigned to the foreground. To enforce temporal continuity, the segmentation is aligned with that of the previous frame, and those regions for which a majority of pixels belonged to the foreground before are added to the foreground too. This allows tracking an object even when it stops moving for an arbitrary time. In contrast, the techniques Neri et al., Signal Processing, vol. 66, no. 2, pp. 219–232, 1998, and Mech and Wollbom, ICASSP'97, will lose track after a certain number of frames, depending on the size of the group of frames and memory length, respectively.

A combination of the two temporal segmentation techniques (Colonnese et al. /m2365, Mech and Gerken /m1949) with the spatial segmentation method (Choi et al., 1997) to form one algorithm is currently under investigation (P. Gerken, R. Mech, G. Russo, S. Colonnese, C. Ahn, and M. H. Lee, in ISO/IEC JTC1/SC29/WG11 MPEG97/m1948, Bristol, U.K., April 1997, and J. G. Choi, M. Kim, M. H. Lee, C. Ahn, S. Colonnese, U. Mascia, G. Russo, P. Talone, R. Mech, and M. Wollbom, in ISO/IEC JTC1/SC29/WG11 MPEG97/m2383, Stockholm, Sweden, July 1997).

A new video object plane segmentation algorithm based on Hausdorff object tracking is an extension of the technique by Meier and Ngan submitted to the ISO MPEG-4 N2 Core Experiment (Meier and Ngan, 1997). The core of the algorithm in T. Meier, K. N. Ngan, IEEE Trans. on Circuits and Syst. for Video Technol., 8:5, 525–538, 1998, is an object tracker that matches a 2-D binary model of the object against subsequent frames using the Hausdorff distance. The best match found indicates the translation the object has undergone, and the model is updated every frame to accommodate for rotation and changes in shape. The initial model is derived automatically, and a new model update method based on the concept of moving connected components allows for comparatively large changes in shape. Optical flow or motion fields could be used, but they are extremely noise sensitive, and their accuracy is limited due to the aperture and occlusion problem.

Video Standards. MPEG-4: Incapable of Automatic Extraction of Objects

Object-based coding is one of the distinct features of the MPEG-4 standard, which is distinguishable from the previous standards, such as MPEG-1 and MPEG-2. Recently, there has been growing interest in segmentation for content-based video coding. This is mainly due to the development of MPEG-4 (ISO/IEC 14496-2, \Information technology—Coding of audio-visual objects, Part 2: Visual, Amendment 1: Visual extensions". Doc. ISO/IEC JTC1/SC29/WG11 N3056, December 1999, ISO/IEC 14496–2, MPEG-4 Video verfication model version 15.0". ISO/IEC JTC1/SC29/WG11 N3093, December 1999, MPEG AOE Sub Group, MPEG-4 proposal package description (PPD)—revision 3", ISO/IEC JTC1/SC29/WG11 MPEG95/N0998, July 1995), which is set to become the new video coding standard for multimedia communication. The MPEG-4 proposal package description identified key functionalities that were not or not well supported by existing video coding standards and should be supported by MPEG-4. These include content-based interactivity, hybrid natural and synthetic data coding, and content-based scalability, to name a few.

To provide these content-based functionalities, MPEG-4 relies on a content-based representation of audio-visual objects. It treats a scene as a composition of several objects that are separately encoded and decoded. This requires a prior decomposition of video sequences into VOPs. Such VOPs will normally be of arbitrary shape. However, a VOP can also consist of the whole frame if no content-based functionalities are required or to guarantee backward compatibility with MPEG-1 and MPEG-2.

Decomposing video sequences into VOPs is in many cases very difficult. If there is only one VOP consisting of the whole rectangular frame, as in current video coding standards, then no explicit segmentation is necessary. The same applies to computer-generated synthetic objects. In most other cases, however, the VOP definition must be performed by some sort of preprocessing. This can be done by automatic or semiautomatic segmentation, manually, or using blue screen (chroma key) technology. The latter method has some shortcomings. It is mainly limited to studio scenes and excludes blue objects. Manual segmentation, on the other hand, is often too time consuming.

Partitioning a video sequence into VOPs by means of automatic or semiautomatic segmentation is a very challenging task. An intrinsic problem of VOP generation is that objects of interest are not homogeneous with respect to low-level features, such as color, intensity, or optical flow. Instead, VOP segmentation involves higher level semantic concepts. Hence, conventional low-level segmentation algorithms will fail to obtain meaningful partitions. At the moment, we are not aware of any algorithm that can automatically perform VOP segmentation accurately and reliably for generic video sequences. The main difficulty is to formulate semantic concepts in a form suitable for a segmentation algorithm. Semiautomatic techniques that get some input from humans, for example, by tuning a few parameters, can significantly improve the segmentation result (J. G. Choi, M. Kim, J. Kwak, M. H. Lee, and C. Ahn, ISO/IEC JTC1/SC29/WG11 MPEG98/m3349, 1998; S. Colonnese, and G. Russo, ISO/IEC JTC1/SC29/WG11 MPEG98/m3320, 1998; C. Gu and M. C. Lee, in IEEE Int. Conf. Image Processing, ICIP'97, Santa Barbara, Calif., vol. II, pp. 514–517, 1997). Currently, this appears to be the most promising approach unless a very constrained situation is present. The most important cue exploited by a majority of techniques is motion. Physical objects are often characterized by a coherent motion that is different from that of the background.

So-called change detection masks (CDMs) and estimated flow fields are the most common forms of motion information incorporated into the segmentation process. There are some major drawbacks of CDMs for VOP segmentation. Normally, only the occlusion zones associated with moving objects are marked as changed, but not the interior of such objects. The estimated flow field on the other hand, demonstrates how difficult it can be to group pixels into objects based on the similarity of their flow vectors. In either case, it seems to be inevitable that additional information such as color or intensity must be included to accurately detect boundaries of moving objects.

Classical motion segmentation algorithms attempt to partition frames into regions of similar intensity, color, and/or motion characteristics (Adiv, 1985, Hotter and Thoma, 1988, Murray and Buxton, 1987). Many of these were inspired by the so-called second-generation coding techniques, with different objectives from those of VOP segmentation. Segmentation algorithms that specifically address VOP generation have also been proposed (Choi et al., /m2091, 1997, Colonnese and Russo, /m3320, 1998, Choi et al., /m3349, 1998, C. Gu and M. C. Lee, Semantic video, in IEEE Int. Conf. Image Processing, ICIP'97, Santa Barbara, Calif., vol. II, pp. 514–517, October 1997, R. Mech and M. Wollborn, A noise robust method for segmentation of moving objects in video sequences, in IEEE Int. Conf. Acoust., Speech, Signal Processing, ICASSP'97, Munich, Germany, vol. 4, pp. 2657–2660, April 1997, A. Neri, S. Colonnese, G. Russo, and P. Talone, Automatic moving object and background separation, Signal Processing, vol. 66, no. 2, pp. 219–232, 1998), many of them in the framework of the ISO MPEG-4 N2 Core Experiment on Automatic Segmentation Techniques.

The proposals in (Mech and Wollborn, 1997, Neri et al., Signal Processing, 1998) employ change detection masks and create one object for each area in the frame that is moving differently from the background. A spatial morphological segmentation technique is presented in. Choi et al., /m2091, 1997. The foreground/background decision is also made based on a CDM. To this end, regions for which a majority of pixels are classified as changed are assigned to the foreground. In Choi et al /m3349, 1998, and Gu and. Lee, ICIP'97, 1997, a user initially has to select objects in the scene by manual segmentation. These VOPs are then tracked and updated in successive frames. The usefulness of user interaction to incorporate high-level information has also been reported in Colonnese and Russo, /m3320, 1998. The performance of the segmentation algorithm is improved by letting a user tune a few crucial parameters on a frame-by-frame basis. In addition, the user is able to select an area containing the object of interest. This allows the algorithm to estimate critical parameters only on the region with the object instead of the whole image that might consist of several regions with different characteristics.

Video Compression

Video communication (television, teleconferencing, and so forth) typically transmits a stream of video frames (images) along with audio over a transmission channel for real time viewing and listening by a receiver. However, transmission channels frequently add corrupting noise and have limited bandwidth (such as cellular phones wireless networking). Consequently, digital video transmission with compression enjoys widespread use. In particular, various standards for compression of digital video have emerged and include H.26X (H261,H263,H263+,H26L), MPEG-1, MPEG-2, MPEG-7 with more to follow, including in development MPEG-7. There are similar audio compression methods such as CELP and MELP. These standards are described in Tekalp, Academic Press 1995.

H.261 compression uses interframe prediction to reduce temporal redundancy and discrete cosine transform (DCT) on a block level together with high spatial frequency cutoff to reduce spatial redundancy. H.261 is recommended for use with transmission rates in multiples of 64 Kbps (kilobits per second) to 2 Mbps (megabits per second).

The H.263 is analogous to H.261 but for bitrates of about 22 Kbps (twisted pair telephone wire compatible) and with motion estimation at half-pixel accuracy (which eliminates the need for loop filtering available in H.261) and overlapped motion compensation to obtain a denser motion field (set of motion vectors) at the expense of more computation and adaptive switching between motion compensation with 16 by 16 macroblock and 8 by 8 blocks.

MPEG-1 and MPEG-2 also use temporal prediction followed by two dimensional DCT transformation on a block level as H261, but they make further use of various combinations of motion-compensated prediction, interpolation, and intraframe coding. MPEG-1 aims at video CDs and works well at rates about 1–1.5 Mbps for frames of about 360 pixels by 240 lines and 24–30 frames per second. MPEG-1 defines I, P, and B frames with I frames intraframe, P frames coded using motion-compensation prediction from previous I or P frames, and B frames using motion-compensated bidirectional prediction/interpolation from adjacent I and P frames.

MPEG-2 aims at digital television (720 pixels by 480 lines) and uses bitrates up to about 10 Mbps with MPEG-1 type motion compensation with I, P, and B frames plus adds scalability (a lower bitrate may be extracted to transmit a lower resolution image).

However, the foregoing MPEG compression methods result in a number of unacceptable artifacts such as blockiness and unnatural object motion when operated at very-low-bit-rates. Because these techniques use only the statistical dependencies in the signal at a block level and do not consider the semantic content of the video stream, artifacts are introduced at the block boundaries under very-low-bit-rates (high quantization factors). Usually these block boundaries do not correspond to physical boundaries of the moving objects and hence visually annoying artifacts result. Unnatural motion arises when the limited bandwidth forces the frame rate to fall below that required for smooth motion.

MPEG-4 is to apply to transmission bit rates of 10 Kbps to 1 Mbps and is to use a content-based coding approach with functionalities such as scalability, content-based manipulations, robustness in error prone environments, multimedia data access tools, improved coding efficiency, ability to encode both graphics and video, and improved random access. A video coding scheme is considered content scalable if the number and/or quality of simultaneous objects coded can be varied. Object scalability refers to controlling the number of simultaneous objects coded and quality scalability refers to controlling the spatial and/or temporal resolutions of the coded objects. Scalability is an important feature for video coding methods operating across transmission channels of limited bandwidth and also channels where the bandwidth is dynamic. For example, a content-scalable video coder has the ability to optimize the performance in the face of limited bandwidth by encoding and transmitting only the important objects in the scene at a high quality. It can then choose to either drop the remaining objects or code them at a much lower quality. When the bandwidth of the channel increases, the coder can then transmit additional bits to improve the quality of the poorly coded objects or restore the missing objects.

In order to achieve efficient transmission of video, a system must utilize compression schemes that are bandwidth efficient. The compressed video data is then transmitted over communication channels, which are prone to errors. For video coding schemes that exploit temporal correlation in the video data, channel errors result in the decoder losing synchronization with the encoder. Unless suitably dealt with, this can result in noticeable degradation of the picture quality. To maintain satisfactory video quality or quality of service, it is desirable to use schemes to protect the data from these channel errors. However, error protection schemes come with the price of an increased bit rate. Moreover, it is not possible to correct all possible errors using a given error-control code. Hence, it becomes necessary to resort to some other techniques in addition to error control to effectively remove annoying and visually disturbing artifacts introduced by these channel induced errors.

In fact, a typical channel, such as a wireless channel, over which compressed video is transmitted is characterized by high random bit error rates (BER) and multiple burst errors. The random bit errors occur with a probability of around 0.001 and the burst errors have a duration that usually lasts up to 24 milliseconds (msec).

Error correcting codes such as the Reed-Solomon (RS) codes correct random errors up to a designed number per block of code symbols. Problems arise when codes are used over channels prone to burst errors because the errors tend to be clustered in a small number of received symbols. The commercial digital music compact disc (CD) uses interleaved codewords so that channel bursts may be spread out over multiple codewords upon decoding. In particular, the CD error control encoder uses two shortened RS codes with 8-bit symbols from the code alphabet GF(256). Thus 16-bit sound samples each take two information symbols. First, the samples are encoded twelve at a time (thus 24 symbols) by a (28,24) RS code, then the 28-symbol code-words pass a 28-branch interleaver with delay increments of 28 symbols between branches. Thus 28 successive 28-symbol code-words are interleaved symbol by symbol. After the interleaving, the 28-symbol blocks are encoded with a (32,28) RS coder to output 32-symbol code-words for transmission. The decoder is a mirror image: a (32,28) RS decoder, 28-branch de-interleaver with delay increment 4 symbols, and a (28,24) RS decoder. The (32,28) RS decoder can correct 1 error in an input 32-symbol codeword and can output 28 erased symbols for two or more errors in the 32-symbol input codeword. The de-interleaver then spreads these erased symbols over 28 code-words. The (28,24) RS decoder is set to detect up to and including 4 symbol errors which are then replaced with erased symbols in the 24-symbol output words; for 5 or more errors, all 24 symbols are erased. This corresponds to erased music samples. The decoder may interpolate the erased music samples with adjacent samples.

A number of patents have been issued in subjects related to the present invention: U.S. Pat. No. 5,048,095 discloses an adaptive image segmentation system that incorporates a closed-loop feedback mechanism in the segmentation/learning cycle. The system can adapt to changes appearing in the images being segmented. It uses a genetic algorithm to optimize the parameters of a pixel-histogram-based segmentation. U.S. Pat. No. 6,026,182 discloses feature segmentation i.e. teaches video compression based on segmenting objects and determining motion vectors for the segmented objects. The method is not fully automatic and requires user interaction. U.S. Pat. No. 5,764,792 discloses identification of rare biological cells in an image from their color, using color histograms to generate masks. U.S. Pat. No. 5,859,891 teaches an interactive method of object extraction, similar to that in U.S. Pat. No. 6,026,182, in which a user draws a polygon in a region of interest, and a computer expands the polygon to include all pixels whose gray scale level resemble the gray scale levels of pixels already within the polygon. U.S. Pat. No. 5,949,905 identifies an adhesive in an image of a printed circuit board, using gray value histograms and a priori information. None of these prior art patents are capable of robust and stable automatic object extraction and segmentation.

There is thus a widely recognized need for, and it would be highly advantageous to have, a method of robust and stable automatic object extraction for segmentation of video frames that is independent of the nature of the image, and does not depend on any specific input video sequences. There is also a widely recognized need for, and it would be highly advantageous to have, a method of robust and stable object extraction for segmentation of video frames that does not require any prior knowledge of the content of the input video sequences. There is also a need for, and it would be advantageous to have a method based on algorithms that are fast, do not consume a lot of computer resources, do not depend on statistical methods, do not produce over-segmentation, and thus enable and provide: adaptive bit allocation for video compression, interactive TV, efficient image representation, quality of service (QoS) and differentiated services (DifferServ) over diverse communication networks (narrow and broad band), video streaming, surveillance, gaming and web caching.

SUMMARY OF THE INVENTION

The present invention relates to electronic video methods and devices, and, more particularly, to digital communication and storage systems with compressed video. Specifically, the invention relates to a method for automatic object segmentation and extraction of input video frames that is robust, stable, and does not require any prior knowledge of the content of the input video images or sequences. The method is based on successive application of, and comprises a series of, algorithms.

According to the present invention there is provided a method for automatic extraction of objects in video sequences, each object represented by an array of pixels, the method comprising: (a) providing at least a first and a second high frame rate video frames, (b) performing a reciprocal illumination correction of the first and second video frames to yield respective first and second smoothed frames, (c) performing a change detection operation between the first and second smoothed frames to obtain a difference image, and (d) performing a local adaptive thresholding operation on the difference image to generate a binary image containing extracted objects, the local thresholding operation using a weight test to determine a boundary of each of the extracted objects, whereby the extraction of the extracted objects by the method is automatic, stable and robust, and whereby no advance knowledge of the video sequences is needed to achieve the extraction.

According to the present invention there is further provided a method for automatic extraction of objects in video sequences, each object represented by an array of pixels, the method comprising: (a) providing at least a first and a second low frame rate video frames, (b) performing a reciprocal illumination correction of the first and second video frames to yield respective first and second smoothed frames, (c) performing an edge detection operation on the first video frame to produce a first edge image, (d) performing a change detection operation between the first and second smoothed frames to obtain a difference image (e) performing a global thresholding operation on the first edge image to produce a first binary edge image, (f) ANDing the difference image and the first binary edge image to produce a first edge-corrected difference image, and (g) performing a local adaptive thresholding operation on the first edge-corrected difference image to generate a second binary image containing extracted objects, the local thresholding operation using a weight test to determine a boundary of each of the extracted objects, whereby the extraction of the extracted objects by the method is automatic, stable and robust, and whereby no advance knowledge of the video sequences is needed to achieve the extraction.

According to the present invention there is further provided a stable and robust method for automatic extraction of objects in color video sequences, each object represented by an array of pixels, the method comprising: (a) providing at least a first and a second high frame rate video frames, (b) obtaining a first edge image of the first video frame, (c) obtaining a difference image based on first and second illumination corrected, smoothed frames derived from the first and second video frames respectively, (d) performing a global thresholding operation on the first edge image to produce a first binary edge image, (e) ANDing the difference image and the first binary edge image to produce a first edge-corrected difference image, and (f) based on the first edge-corrected difference image, generating a second binary image containing extracted objects, whereby the extraction of the extracted objects by the method is automatic, stable and robust, and whereby no advance knowledge of the video sequences is needed to achieve the extraction.

According to each of the above embodiments of the method of the present invention, in case where the extracted objects have fragmented boundaries, the method further comprises re-unifying the fragmented boundaries.

The present invention successfully addresses the shortcomings of the presently known configurations by providing a method of automatic object extraction for segmentation of video frames that is automatic, robust, and independent of the nature of the video images. The method of the present invention is based on algorithms that are fast, do not consume a lot of computer resources, do not depend on predefined parameters and data, and do not produce over-segmentation. The method and algorithms of the present invention thus enable and provide: adaptive bit allocation for video compression, interactive TV, efficient image representation, quality of service (QoS) and differentiated services (DifferServ) over diverse communication networks (narrow and broad band), video streaming, surveillance, gaming, web caching, video mail and unified messaging. In addition, working with objects enables application of transform codings that are not based on square blocks of pixels such as 8×8 or 16×16, but use different sizes and shapes of blocks to cover the image, thus reflecting the activities in the image through the locations and shapes of the objects. The main problem in the current compression methods (MPEG-1,2,4, H263, H26L) lies in the fact that blocks are chosen independently from their relations to the nature of the pixels. Thus, a single block can belong to both the border of the object and to the background. Therefore, while the background is changing, each movement of the object will lead to a poor block matching. The present invention enables to differentiate between background (static) and foreground (moving objects). While staying in the framework of the standard and in order to overcome this problem, we can reorder the blocks in the following way: a block will be placed on either the object or the background. This will be accomplished by assigning different block sizes. Outside the MPEG-4 framework, segmented and/or extracted objects can be used to automate editing work, e.g. in interactive television. The segmentation and object extraction techniques will serve as a starting point for commercial MPEG-7 multimedia databases. The ability to separate between background and foreground enables to perform a better automatic calibration and lighting correction between frames. Every video camera has a sensitive sensor that measures the amount of needed light for every frame, and then tunes the camera parameters (exposure time, shutter size). One of the major problems in a video shooting is its inability to determine which area will be sampled by the sensors. Sampling a non-object area can lead to a very poor object exposure in the final photo. Therefore, in most of the cameras, it has been assumed that calibration is performed on the center of the frame. This is an obvious problem that degrades the quality of the final images.

BRIEF DESCRIPTION OF THE DRAWINGS

The invention is herein described, by way of example only, with reference to the accompanying drawings, wherein:

FIG. 2 describes a step-by-step the application of the "breadth first search" (BFS) algorithm.

DESCRIPTION OF THE PREFERRED EMBODIMENTS

The present invention is of a method for stable, robust, automatic object extraction of input video frames, for use in digital communication and storage systems. The method and algorithms of the present invention can be used in a wide variety of applications, e.g. in: adaptive bit allocation for video compression, to improve the quality and reduce bandwidth by smart allocation of bits to regions of interests, where these regions are determined by the locations of the moving objects and by the ability to differentiate between background (static) and foreground (moving objects); interactive TV; efficient image representation, quality of service (QoS) and differentiated services (DifferServ) over diverse communication networks (narrow and broad band); video streaming, surveillance, gaming, web caching and proxy; video mail; unified messaging; and reducing of buffer sizes to reduce the delay in the processing of the video sequences, and to increase the efficiency of the bit allocation mechanism, eliminating the camera noise. The method and the algorithms that are contained in it, can be incorporated in any standard video format such as MPEG-1,2,4,7, H263, or H26L, without modification of the standard. Specifically, the present invention can be used for automatic object segmentation and extraction of moving objects between two video frames. A major innovative advantage of the method and algorithms of the present invention, is that no advance knowledge of the video content is required to achieve automatic object extraction. The method can work with any video sequence, provided that the camera capturing the video sequence is static. Otherwise (for a non-static camera), the assumption used here is that the video sequence has undergone global motion compensation to offset the camera motion.

The present system has the capability also to have a "minimal segmentation algorithm". We automatically segment and extract objects that move significantly. These objects may have different characteristics. For example, a small moving object may be a part of a larger static object, e.g. in the case of a talking mouth (a moving segment) that is part of a face. The proposed method will segment and extract the whole face. In another example, if the fingers of a hand are moving, we expect to get the whole static hand that contains the fingers. An object extracted with the method of the present invention may also contain parts that each may have different characteristics. For example, in the image of a table tennis player (shown below in FIG. 4), the player seems to have four different segments, i.e. a shirt, short pants, a head and a hand, but semantically, these four different segments belong to a single object.

The principles and operation of the automatic object extraction method according to the present invention may be better understood with reference to the drawings and the accompanying description.

Figure 1:
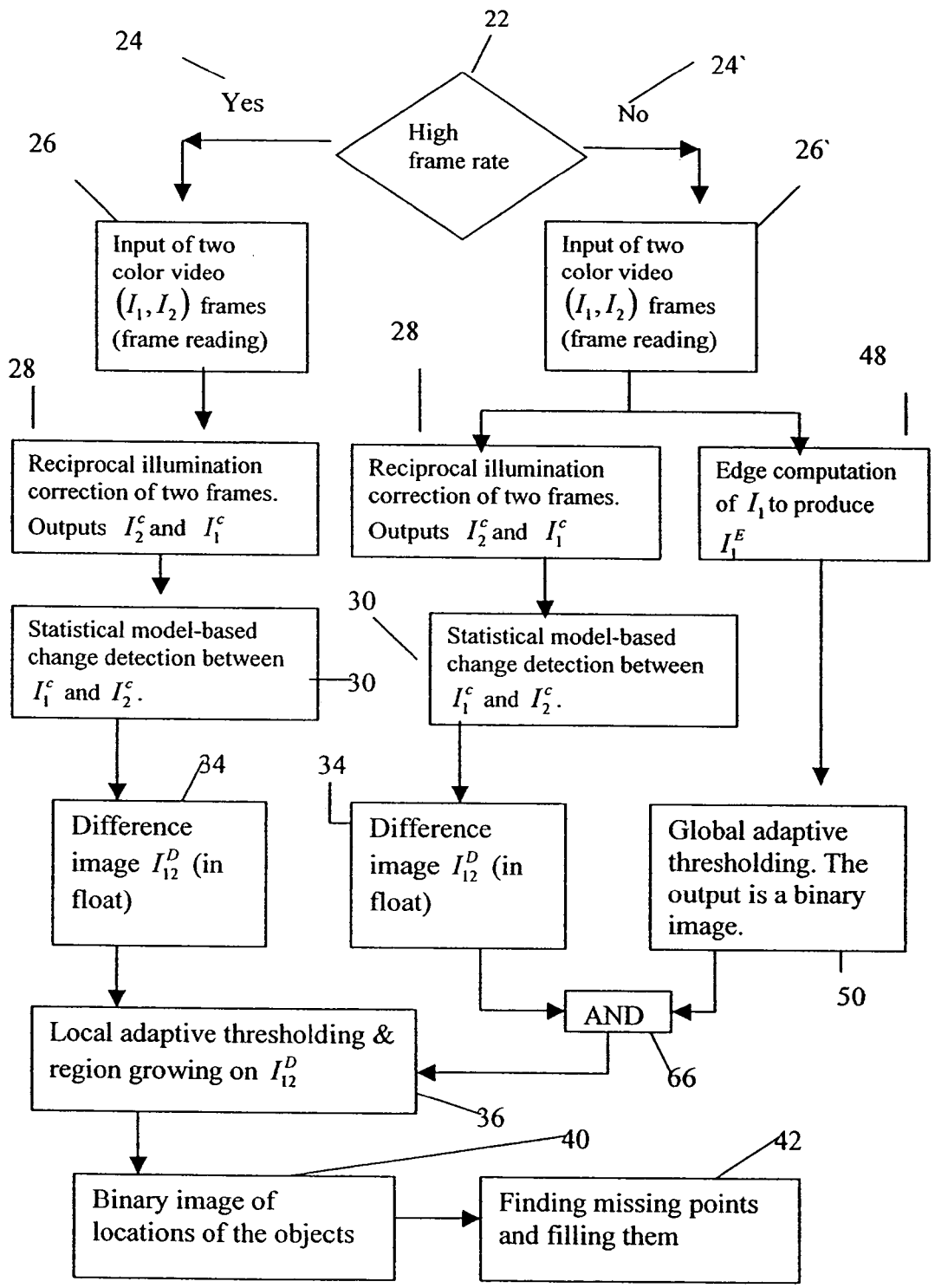
FIG. 1 is a block diagram indicating a preferred embodiment of the method of the present invention.
Figure 3A:
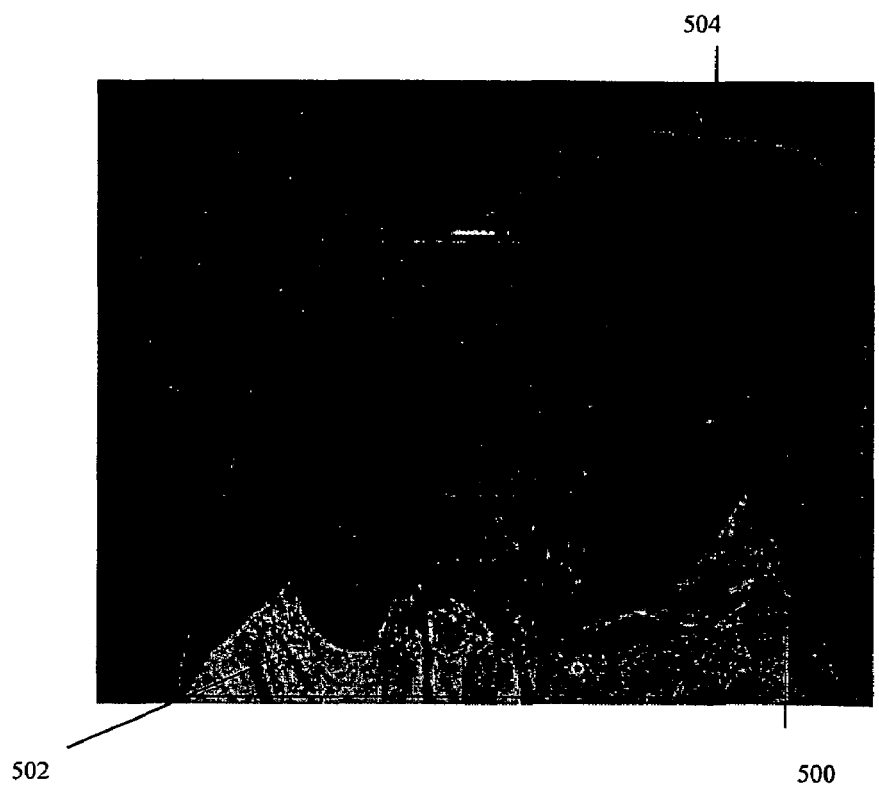
FIG. 3 describes one embodiment of the process of object extraction, in which the accuracy of the extracted objects ("mother and daughter") is improved from (a) to (g), and which demonstrates the ability of the algorithm to include static areas in the object extraction.
Figure 3B:
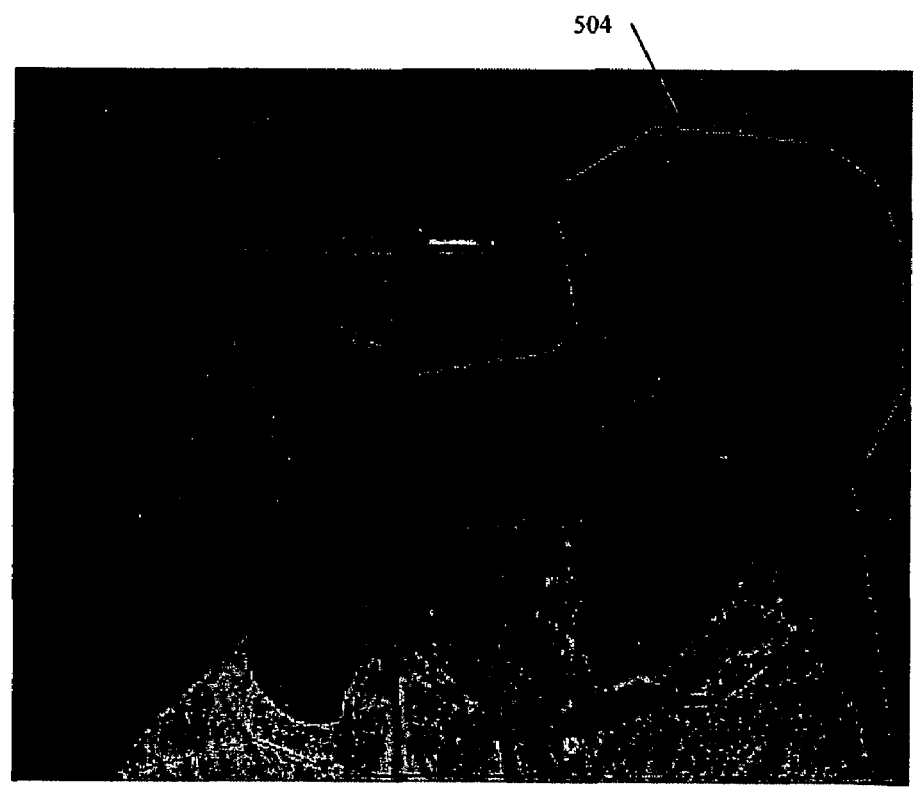
Figure 3C:
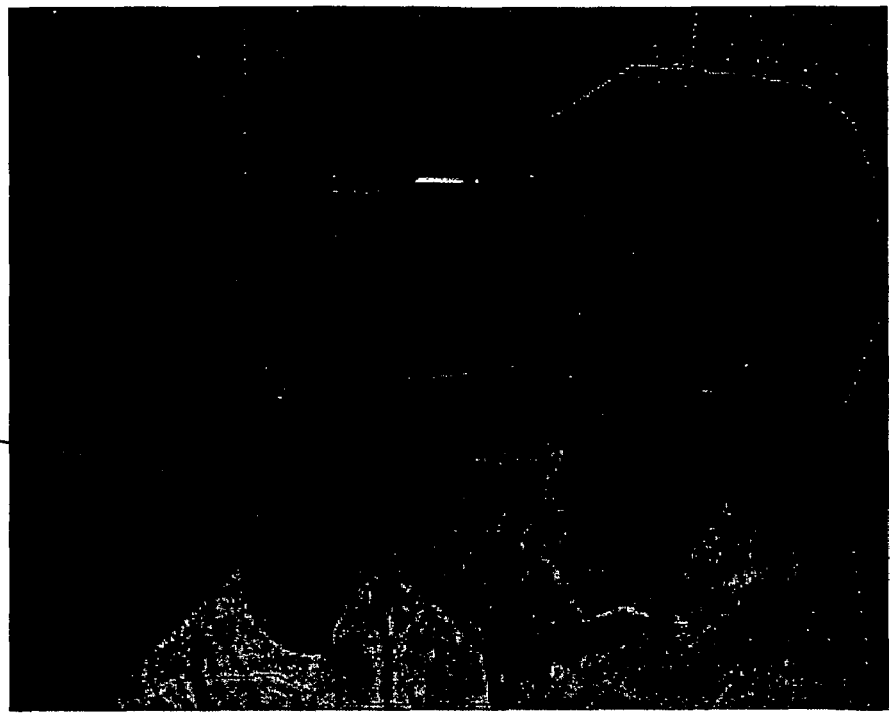
Figure 3D:
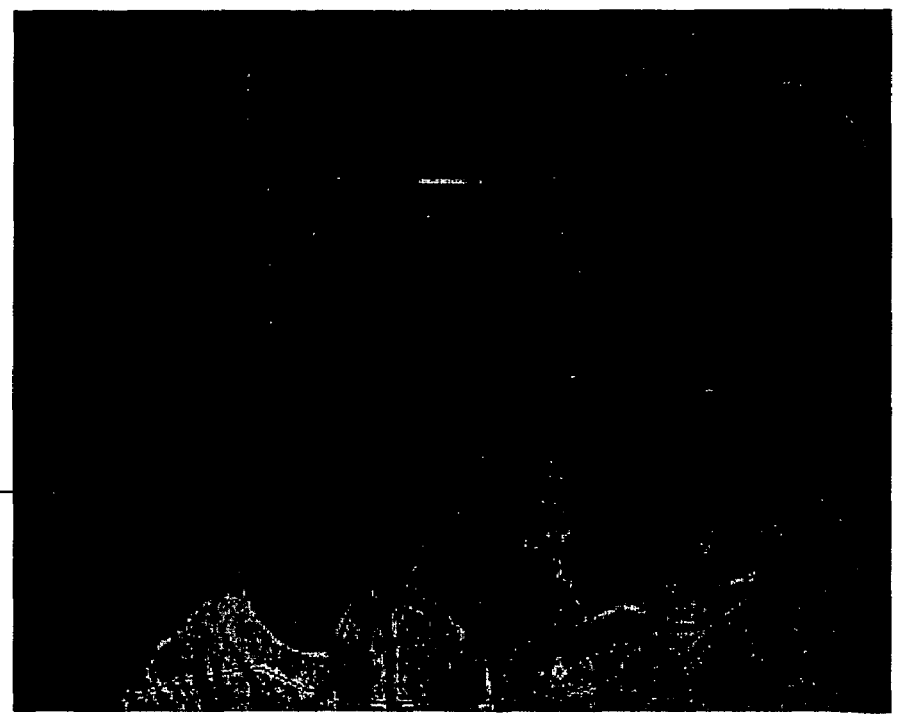
Figure 3E:
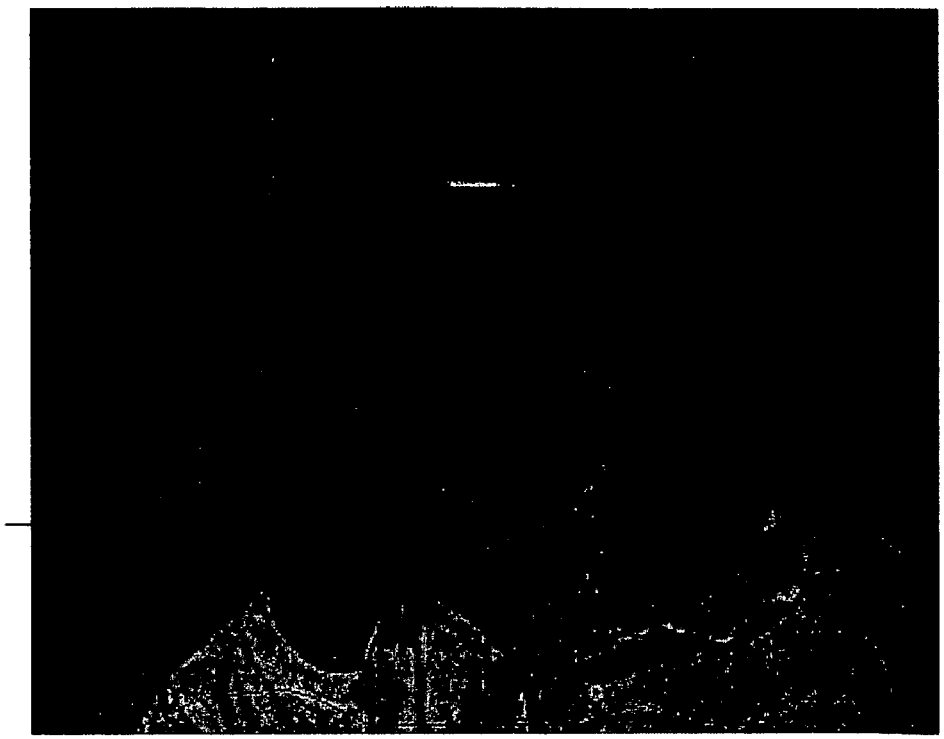
Figure 3F:
Figure 3G:
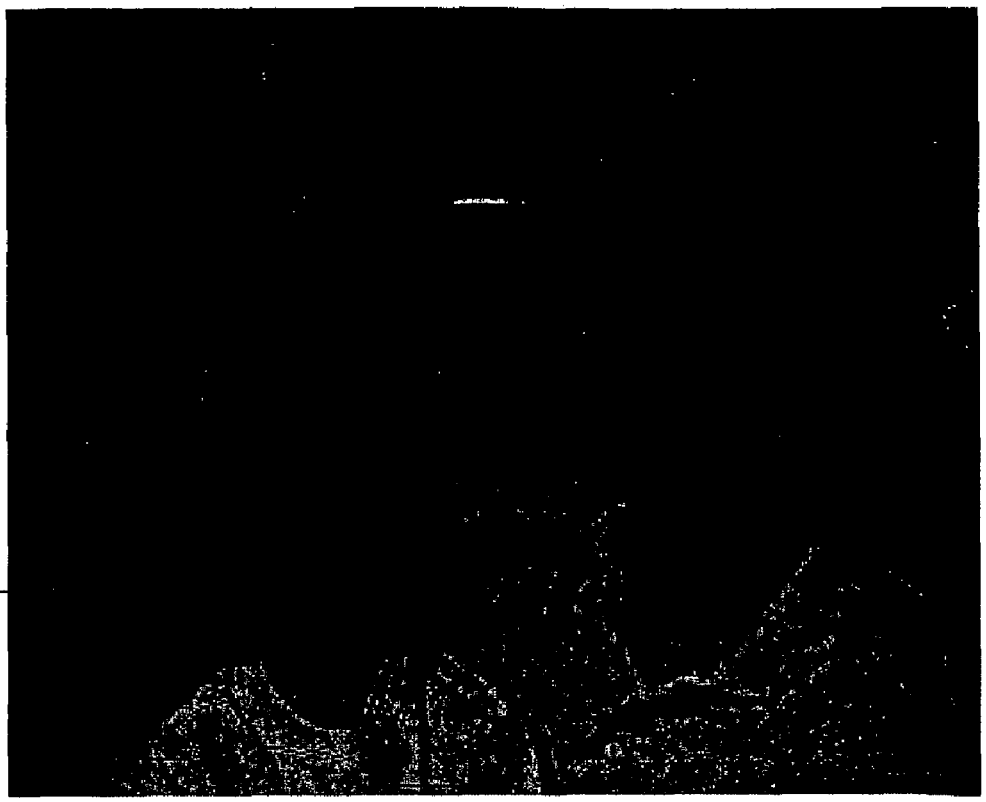
Figure 4A:
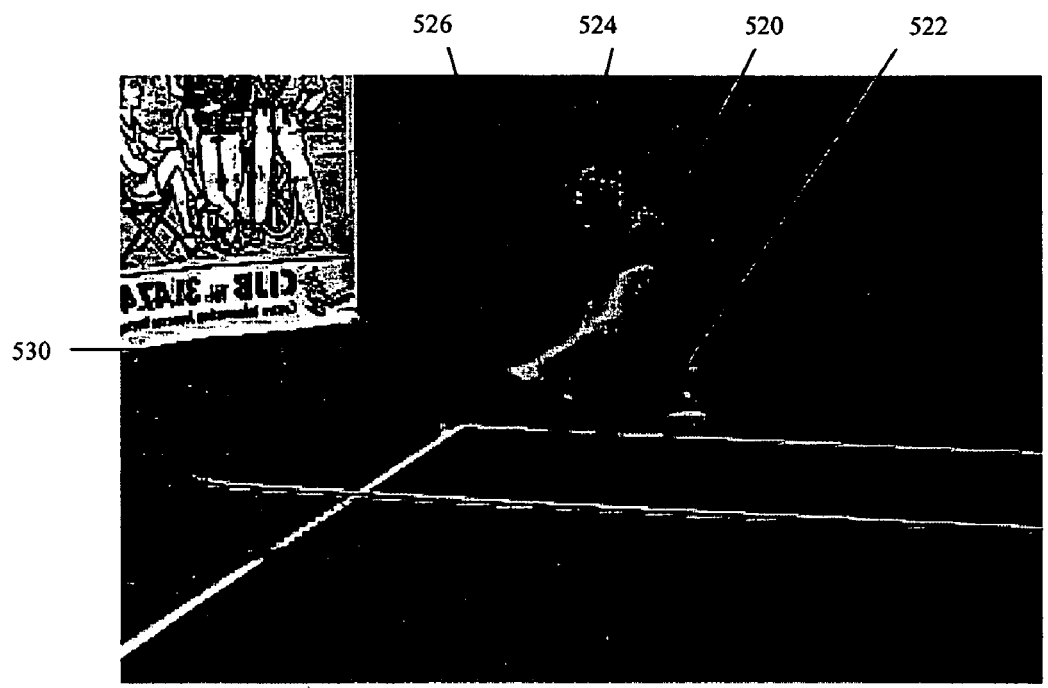
FIG. 4 describes the process of another embodiment of the process of object extraction, in which the accuracy of the extracted object ("table tennis player") is improved from (a) to (f), and which also demonstrates the ability of the algorithm to include areas with different characteristics in the object extraction.
Figure 4B:
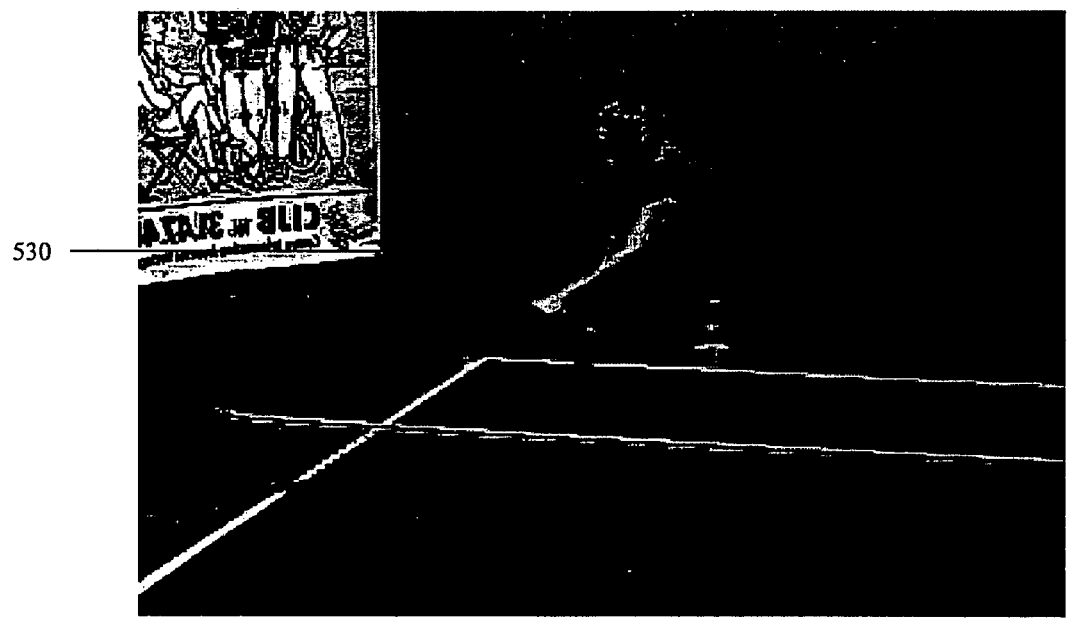
Figure 4C:
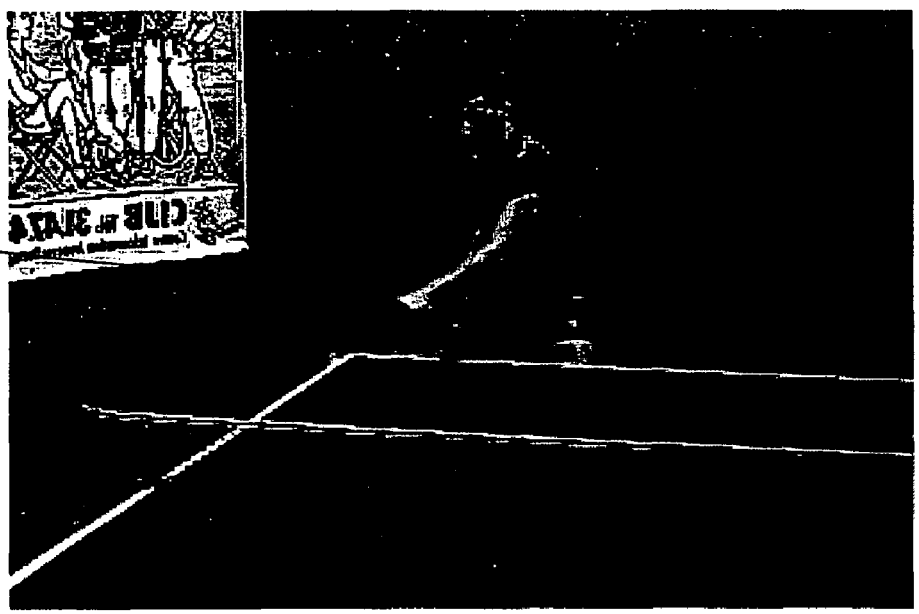
Figure 4D:
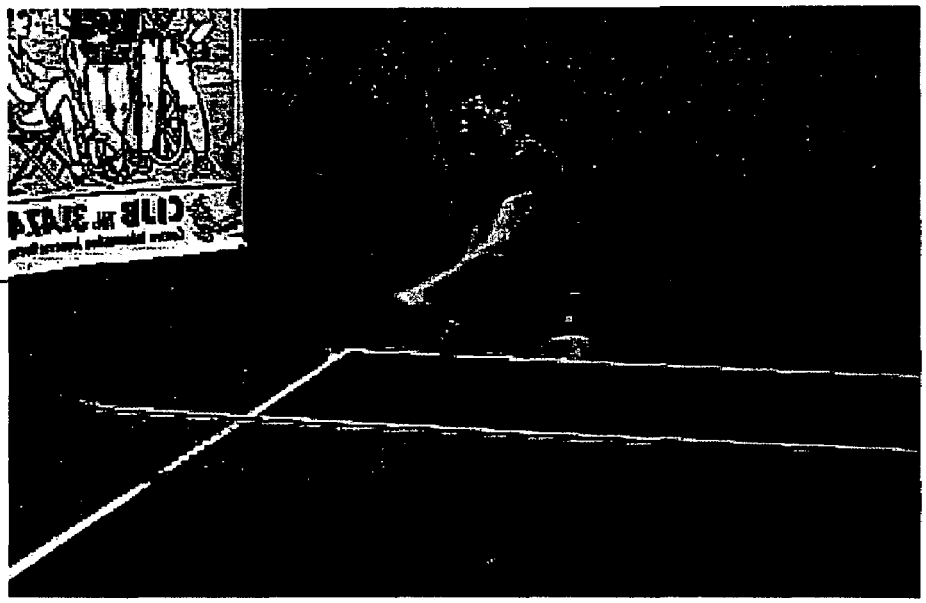
Figure 4E:
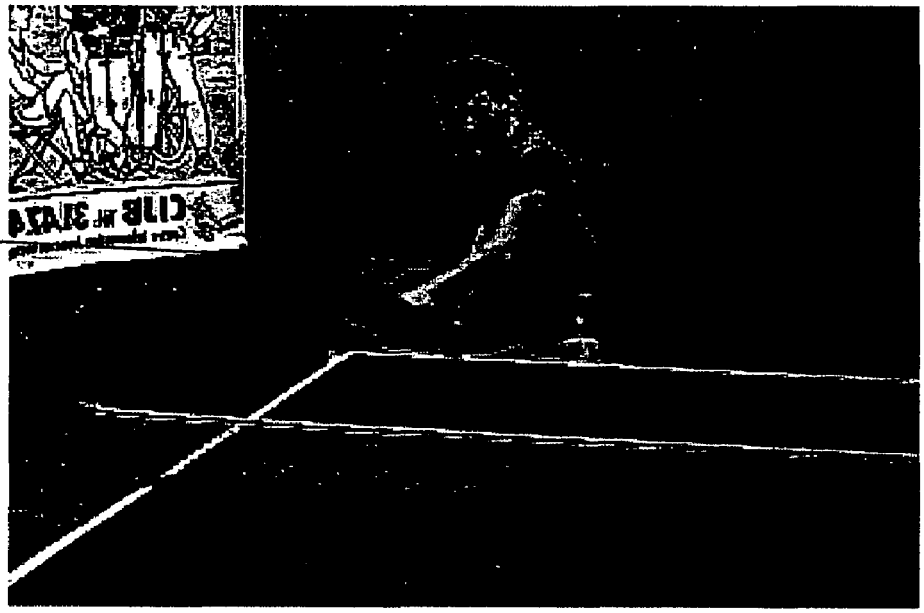
Figure 4F:
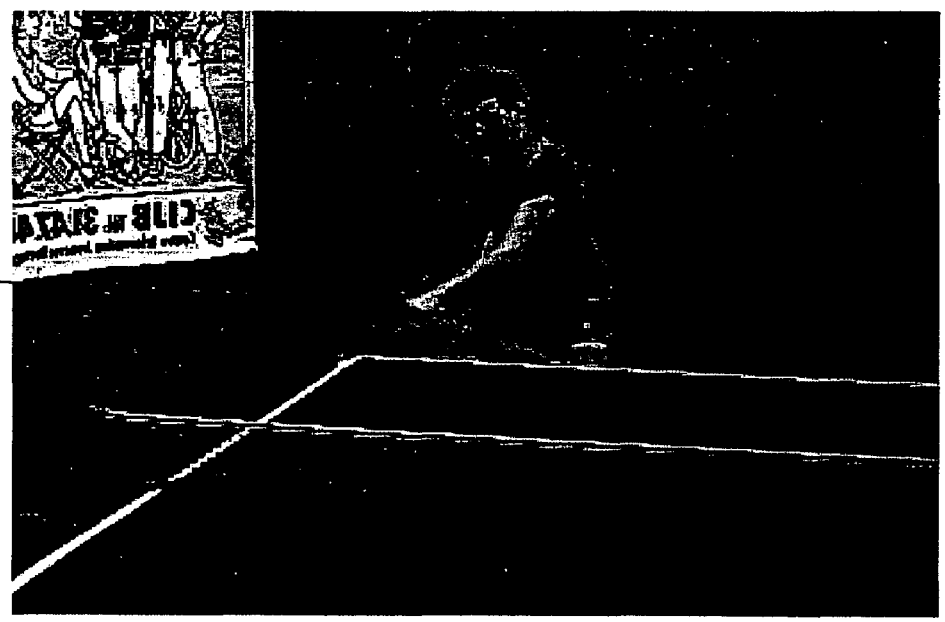

FIG. 1 shows a block diagram of a preferred embodiment of the method of the present invention. The only input parameter to the algorithm is a "number of frames per second" ("frame rate") 22, fed to the algorithm. There is no need for any other prior knowledge regarding the video images. Frame rate 22 may be either high ("Case I") or "low" ("Case II"), and a logical test (check) is first used to determine the rate. In Case I, typically when rate 22 is equal to or larger than about 15 frames per second, we assume that the changes between consecutive frames are small, and we go to a "YES" parameter 24 in FIG. 1. Otherwise (Case II, rate 22 smaller than about 15 frames per second), we assume that the changes between consecutive frames are large, and we go to a "NO" parameter 24' in FIG. 1.

Case I: After a "YES" decision, at least two ("first" and "second") input, preferably colored video frames, $I_1$ and $I_2$ are first read in a "frame reading" step 26. While the method can work with two, three, four, etc. frames, we will henceforth refer to two, "first and second" frames in the sense of "at least two" frames. This is followed by a reciprocal illumination flattening (correction) step 28 of $I_1$ and $I_2$, which is preferably performed by a relative re-normalization of the pixel values through a smoothing operation that preserves edges. Step 28 yields smoothed frames (outputs) $I_1^c$ and $I_2^c$ respectively. Next, a statistical model-based "change detection" step 30 is applied between smoothed frames $I_1^c$ and $I_2^c$. This generates a difference image or output (in float) $I_{12}^D$ 34, that shows moving objects. This is followed by a local adaptive thresholding step 36 on image $I_{12}^D$ that may include a region-growing substep. The region-growing is based on this local threshold. A binary image $I^D_{12bin}$ 40 is then generated using this threshold, image 40 showing the location of each object in the frame. Each object in binary image 40 has a bounding contour composed of polygons that may have missing pixels (i.e. fragmented boundaries). A missing-point filling (or boundary re-unifying) step 42 is then performed to fill the missing pixels on each polygon.

Case II: After a "NO" decision, at least two input, preferably colored video frames, $I_1$ and $I_2$ are first read in a "frame reading" step 26', identical with step 26 in Case I. This is followed by a reciprocal illumination flattening (correction) 28' of $I_1$ and $I_2$, identical with step 28. Step 28' yields smoothed frames (outputs) $I_1^c$ and $I_2^c$ respectively. In parallel with step 28', and unlike in Case I, an edge detection step 48 is applied on $I_1$ to produce a first edge image $I_1^E$. Next, a statistical model-based "change detection" step 30' identical with step 30 is applied between smoothed frames $I_1^c$ and $I_2^c$. This generates a difference image or output (in float) $I_{12}^D$ 34', that shows moving objects. Next, a global adaptive thresholding step 50 is applied on first edge image $I_1^E$. Unlike step 36 in case I, global thresholding 50 operates differently than the local thresholding in step 36 and does not include a region-growing procedure. The output of global adaptive thresholding step 50 is a first binary image $I_{1bin}^E$ which is fed into an AND gate together with image $I_{12}^D$ 34' for an ANDing operation 66, which is an additional operation unique to Case II. The output of ANDing step 66 is an edge-corrected difference image $I_{12ec}^D$ that is fed into local adaptive thresholding 36, and from here the algorithm proceeds as in Case I. The binary image generated by thresholding 36 in Case II is referred to as a "second" binary image.

Preferred and detailed ways of implementing each one of the steps in FIG. 1 are explained next. Case I is explained fully, while details in Case II are provided only regarding the differences vs. Case I.

Case I: In frame reading 26, we read as input two preferably colored video frames $I_1$ and $I_2$. $I_1$ and $I_2$ can have any size, can have 8, 16 or 24 bits per pixel, and can be of any color format (for example, gray, RGB, YUV, YIQ). A different illumination between two consecutive frames can falsely lead to identification of the wrong object, and to prevent this false identification, we carry out reciprocal illumination correction 28. That is, we correct the illumination of frame $I_1$ to fit (i.e. relative to) the illumination of frame $I_2$, and the illumination of frame $I_2$ to fit the illumination of frame $I_1$. In other words, we flatten or "equalize" the illumination in each frame relative to the other, so that illumination is not a factor in the selection process that eventually determines the moving objects.

The algorithm, which equalizes the illumination through the "flattening" part of two input video frames, is preferably done in the following way: we take the original frame $I_1$ and we smooth it with a low-pass kernel (filter). The low pass filter is preferably either a bilateral filter (which smoothes the frame while preserving well the edges of the frame), a Gaussian filter, or a non-decimated scaling wavelet filter. The bilateral non-decimated filters are defined as filters with impulse responses which may variously have the property (a) of being scaling functions in the sense of wavelet theory; (b) of being wavelet functions in the sense of wavelet theory; (c) of being spline functions in the sense of spline theory; or (d) of being Gaussian functions or their derivatives. The wavelet filter is typically a bi-orthogonal filter of length 9. We apply the low-pass filtering that smoothes the image in a selective way, in order not to damage (degrade) the high-pass frequencies that represent edges. The outcome is an increase in the pixel values as follows: pixels that have a low value are increased by a small fraction, while pixels that have large values are increased by large fractions. We call this "selective pixel value increases". The illumination correction eliminates any possibility to identify wrong moving objects via subtraction. We denote the two frames after the illumination correction of $I_1$ and $I_2$ by $I_1^c$ and $I_2^c$, respectively. Next, we normalize each pixel value in both frames to be between 0 to 255 with, for example, a logarithmic scaling function. The result is a "smoothed" edge preserved frame. The smoothing is done by application of a convolution with the filter values in the x and y directions in a separable way. Illumination correction step 28 is performed even if there is no illumination difference between consecutive frames. We note that other illumination correction techniques are known in the art, and may be used with the method of the present invention.

Next, we divide the original frame by its smoothed (frame) version, the result being a new frame, in which the pixel values are between 0 and 1. The pixels in the new frame are normalized to be between −128 to 128. That is, we normalize the two images by a preferably logarithmic function so that their pixel range is between 0 and 255. In this procedure we do not damage the polygon of the object. This is true because in order to find an object, we identify its surrounding polygon without performing subtraction between consecutive frames.

Next, we perform statistical model-based change detection 30 between frames $I_1^c$ and $I_2^c$, for identification of moving areas. In order to determine moving regions and to classify which areas are static and which are moving, we need to reduce the camera noise. This initial classification, which is based on change detection, will mark regions as potential foreground candidates. The marking of the regions is based on a statistical significance test. This step has a number of advantages. First, it reduces the computational load of the motion estimation phase, by eliminating most of the background regions from the estimation process. This is especially important if the moving objects are small compared to the overall frame size. Second, it increases the robustness of the motion estimation, by eliminating noisy background regions that may be falsely detected as moving. Third, it eliminates the camera noise that can lead to a false detection of moving areas.

We preferably start step 30 by computing the gray level differences between the two frames $I_k(x,y)$ and $I_{k+1}(x,y)$. The output image is $D=\{d_k(x,y)\}$ where $d_k(x,y)=I_{k+1}(x,y)-I_k(x,y)$. The index k denotes the pixel locations on the image grid. Under the hypothesis that no change occured at location (x,y), the corresponding difference $d_k(x,y)$ obeys a zero-mean Gaussian distribution $N(0,\sigma)$ with variance $\sigma^2$, that is, $$p(d_k(x, y) | H_0) = -\frac{1}{\sqrt{2\pi\sigma^2}} \exp\left\{-\frac{d_k^2(x, y)}{2\sigma^2}\right\}. \tag{9}$$

Since the camera noise (assumed white) is uncorrelated between different frames, the variance $\sigma^2$ is equal to twice the variance of the assumed Gaussian camera noise distribution. $H_0$ denotes the null hypothesis, i.e. the hypothesis that there is no change at pixel k. Eq. 9 reveals that $p(d_k(x,y)|H_0)$ depends only on the squared ratio of the gray level difference normalized with its standard deviation, that is, on $(d_k(x,y)/\sigma)^2$. It therefore seems reasonable to decide on the label for pixel k based on this squared ratio. The unknown parameter $\sigma$ can be estimated offline for the used camera system, or recursively online from unchanged regions while working on a sequence.

In order to make the detection more reliable, decisions like the one we are faced with are usually based on evaluating the set of differences $d_i$ inside a small decision region, instead of only at a single pixel. The idea behind this approach is that by taking into account a higher number of samples, the overlap between the distributions of the test statistics for the cases in which all samples are either "unchanged" or "changed" can be considerably decreased. Therefore, rather than performing the significance test directly on the values $d_k(x,y)$, it is better to evaluate a local sum of normalized differences $$\Delta_k(x, y) = \sum_{(x',y') \in W(x,y)} \frac{d_k^2(x', y')}{\sigma^2} \qquad (10)$$

where W(x,y) is a window of observation centered at (x,y). Under the assumption that no change occurs within a window, the normalized differences $d_k/\sigma$ obey a Gaussian distribution N(0,1), and are spatially uncorrelated. Thus, the local sum $\Delta_k(x,y)$ follows a $X^2$—distribution with N degrees of freedom, N being the number of pixels within the window W(x,y). We thus compute the local sum $\Delta_k(x,y)$ of $(d^k(x,y)/\sigma)^2$ inside a small sliding window $W_i$, with i denoting the center pixel of the window. It is immediately evident that when assuming $H_0$ for all sites inside $W_i$, the joint distribution of the differences inside $W_i$ depends only on $\Delta^2$. Using the measurement window corresponds to applying a low-pass filter to the (squared) difference image, thus reducing the noise on the one hand, but causing a blurring effect on the other hand. The reason for this is that it detects changes anywhere within the window, attributing the result to the center pixel regardless of precisely where the changes occur. Alternatively, we can assign the decision to all pixels inside the window. This "macro-pixel" approach considerably reduces the number of sites to be tested, but on the other hand it decreases the spatial resolution even further. An acceptable compromise is a window sized between 3×3 and 5×5 pixels.

With the distribution $p(\Delta_k(x,y))$ known, we can obtain a decision rule between "changed" and "unchanged" pixels, by using a significance test on $\Delta_k(x,y)$. For this purpose, we specify a significance level $\alpha$, and compute a corresponding threshold $t_\alpha$ according to $$\alpha = Pr\,ob(\Delta_k(x,y) > t_\alpha | H_0) \qquad (11)$$

The significance level $\alpha$ is in fact the false alarm rate associated with the statistical test. The higher the value of $\alpha$, the more likely we are to classify unchanged pixels as changed. The local sum $\Delta_k(x,y)$ is now evaluated at each location k on the image grid, and whenever it exceeds $t_\alpha$, the corresponding pixel is marked as changed, otherwise as unchanged.

From the description above, it is obvious that the significance test depends on the noise variance $\sigma^2$. Thus, an accurate estimate of the noise variance is crucial for the performance of the test. To ensure the performance, the variance is estimated only within background regions of the current frame, to remove the influence of changed regions. The background regions are determined according to the tracked mask of the previous frame. In case the background regions are not yet known, e.g. in the first frame or after a scene-cut, a robust estimation scheme is used, in which the highest 5% differences are removed from the estimate.

Like all change-detection based methods, moving pixels will be marked as changed only within areas that are sufficiently textured. In other words, within smooth, uniform areas, only a small percentage of the overall pixels will be marked as changed, mostly due to the covered/uncovered background. Thus, it is obvious that we cannot make a decision for each region based on a majority rule, since many truly moving regions will be eliminated in the process. Therefore, a region is classified as a foreground candidate if typically more than 10% of its pixels are marked as changed; otherwise, it is marked as background.

Finally, in order to avoid elimination of slowly moving regions, we must also consider the information gathered in previous frames of the sequence. For this purpose, regions that a majority of their pixels appear in the tracked mask of the previous frame, are marked as foreground candidates as well.

In our experiments we found that the input parameter a of the test is not critical. $\alpha$ is typically computed as follows: we assume that we are working in a window of size 5×5 pixels. We take the map of the variances of each pixel in this window. We compute the histogram of the pixels in this window. We typically ignore 10% of the variances with the highest values. Then, we compute the average of the variances.

Step 30 in the algorithm produces as an output the difference image $I_{12}^D$ (34 in FIG. 1). The difference image is in float, so decimal numbers, even those that are smaller than 1, are present.

In the next step (36 in FIG. 1) we compute the local adaptive thresholds on the $I_{12}^D$ image. There are different local thresholds, connected to different objects in the image. Each step that computes a local threshold may be accompanied by a region-growing procedure. We scan the image according to the intensity values of the pixels, and then we compute local thresholds preferably in the following way: we typically take at least 10 pixels that have the highest intensity values among all the pixels in the frame. These pixels will be the "anchor" points that will be the foundation for deriving the final local connected components. Initially, we choose the first pixel $A_1$ that has the highest gray-level value. Since an object is a set of pixels, the list of all the pixels that composes a local object can be preferably found by applying the "breadth first search" (BFS) algorithm, together with a novel weight function application to calculate a weight ("weight test"), in the neighborhood that contains the object. We note that although the BFS algorithm and its application are known, its use together with the weight "test" as described below is novel and non-obvious. We also note that other scan algorithms may be used in conjunction with the weight "test" described below to determine a boundary of an extracted object.

The algorithm starts the process with pixel $A_1$, and scans its surrounding pixels. Since we assume that $A_1$ is contained in a local object, we assume that the pixels around it will have high intensity values. After the BFS chooses a pixel, we compute a pixel weight that is based on gradient magnitudes. This weight is expected to be proportional to the object saliency. The weight is supposed to increase as long as the presently scanned pixel belongs to the object or its boundary. We preferably choose the gradient magnitude as the weight of each pixel. The weight of an object is defined to be the average of the weights of the pixels along the object boundary.

A weight is attached to each pixel that is found by the BFS. We approximate the gradient vector at a pixel (u,v) according to $$\left( \frac{f(u+1,v) - f(u,v) + f(u+1,v+1) - f(u,v+1)}{2}, \right. \qquad (12)$$
$$\left. \frac{f(u,v+1) - f(u,v) + f(u+1,v+1) - f(u+1,v)}{2} \right)$$

where f(u,v) is the gray-level of the pixel (u,v), at column u and row v in the image. (u+1,v) is the pixel immediately to the right of pixel (u,v), (u,v+1) the pixel immediately above pixel (u,v), and (u+1,v+1) is the pixel immediately above pixel (u+1,v). For a given pixel $p_i=(u_i,v_i)$, let $w(p_i)$ be the intensity value at column $u_i$ and row $v_i$ in the image. The weight of a given segment C is defined by $$w(C) \stackrel{def}{=} \frac{1}{|\partial C|} \sum_{q \in \partial C} w(q) \quad (13)$$

where $\partial C$ is the set of boundary pixels of the segment C and $|\partial C|$ is the size of this set. A pixel q is defined as a boundary pixel of the segment C if it belongs to C, and if at least one of its four nearest neighbors does not belong to C. The definition (13) has the following convenient property: the weight of the union of a segment C with a segment that is composed of a single pixel can be computed in a constant number of operations. Let p be a pixel that is united with the segment C. Let C' be the result of the union between the segments C and {p}. The weight of C' satisfies $$w(C') = \frac{w(C) \cdot s(C) + w(p) - \sum_{q \in \partial C \text{ and } q \notin \partial C'} w(q)}{s(C) + 1} \quad (14)$$

where s(C) is the number of pixels that are contained in segment C, and where the right side of Eq. 14 represents a "weight function" used to calculate weight w(C'). It is clear that the set $\{q | q \in \partial C \text{ and } q \notin \partial C'\}$ is composed only of pixels that are nearest-neighbors of pixel p. Therefore, only a constant number of operations is required to compute $$\sum_{q \in \partial C \text{ and } q \notin \partial C'} w(q).$$

The same is true for w(C'). We note that although the weight function used in Eq. 14 to calculate weights is a preferred embodiment of a weight function for the purposes of the present invention, other functions may perform, albeit less advantageously, a similar function.

Through the visit by the BFS, while ignoring the value of $A_1$, we get a graph in which the y axis represents the weight of each pixel in the neighborhood of $A_1$, and the x axis is the pixel itself. We expect that if we are inside an object, then the weight w(C') will be monotonically increasing, and if we get closer to the boundary of the object the weight will be monotonically decreasing till we reach a plateau (saturation level—the graph is almost parallel to the x axis). Thus, the surrounding boundary of the object is determined by the weight w(C') reaching a plateau. The application of this weight "test" for the determination of the boundary of the object, in the context of a local adaptive thresholding operation, is a key, novel, and non-obvious feature of the present invention.

We now go on to a second highest pixel $A_2$, which is located in another location in the frame, and repeat the procedure above. We continue this way till we visit all the pixels with the highest gray-level intensities. We skip some of the initially chosen pixels, if they are already contained in one the identified objects. The BFS iterative procedure, with the application of the weight test to determine the boundary of an extracted object, is now described by way of a particular example in FIG. 2.

FIG. 2 shows the gray levels of an area in the image, each gray level represented by one pixel. We start by choosing in the image a pixel 300, which has the highest gray level, i.e. 255. We choose the connectivity of the pixels neighboring pixel 300 to be four. Next, we choose a pixel 302, which has the second largest gray level (i.e. 254) among the four pixels neighboring pixel 300. We calculate a first weight. Next, we choose a pixel 304 with the third largest gray level (i.e. 240) among the four pixels neighboring pixel 302. We calculate a second weight. If we are inside a segment, the second weight increases vs. the first one, as happens in this instance. Next, we choose a pixel 306 with the fourth largest gray level (230) among the four pixels neighboring pixel 304, and calculate a third weight. If we are inside the segment, the third weight increases vs. the second one, as happens in this instance. Next, we repeat the pixel selection, choosing a pixel 308 with the next highest gray level (185) among the neighbors of pixel 306. A calculation of a fourth weight shows that it increases, indication that pixel 308 also resides inside the segment. Next, we repeat the pixel selection, choosing a pixel 310 with the next highest gray level (180) among the neighbors of pixel 308. A calculation of a fifth weight shows now that the weight decreases (meaning that pixel 310 resides outside the segment). Therefore, pixels 300 to 308 constitute an object 320.

This procedure is applied in a recursive way, in which we assume that the next pixel with the highest gray level, which does not belong to object 320, is used as a starting pixel for a new application of the BFS procedure. We thus choose a pixel 330 with the next highest gray level (i.e. 200) that does not belong to object 320. We calculate a new weight. Next, we choose the pixel with the highest gray level neighboring pixel 330. This happens to be pixel 310 (gray level 180). We compute the weight that contains pixels 310 and 330, and compare it with the previous new weight above. The weight increases. Next we choose in the four pixels neighboring 330 a pixel 332 (gray level 91) and calculate the weight, which now decreases. Therefore, pixels 310 and 330 form a second object 340, while pixel 332 is outside object 340.

Although we now have suspected moving segments that belong to a single object, some of these apparently moving segments may in fact be static segments contained in a larger object. In FIGS. 3(a) to (g), we demonstrate in the sequence of "mother and daughter" the ability of the method of the present invention to add static elements that are part of a whole object that contains moving parts, to an extracted moving object. In (a) to (g), shoulders 500 of the mother and a shirt 502 of the daughter are static. Despite this, a contour (polygon) 504, which marks the extracted object, contains both shoulders 500 and shirt 502.

After the identification of each object in step 36 in FIG. 1, two additional tasks may have to be accomplished: the first is to expand the initial identified moving segment via a region-growing algorithm, so that we can get a larger static object that contains internal moving objects. The surrounding polygon can have a certain varying distance from the identified object. This distance is a parameter to the algorithm. In other words, we may not have a tightly-bound polygon that is placed accurately on the borders of the object. The distance of the surrounding polygon from the object is considered the "error" of the bounding polygon. If the error is 0, then the surrounding polygon describes the object very accurately, and it is considered a tight representation of the object. As the error gets larger (above 0) the surrounding polygon is less tight, and the distance between the boundaries of the object and the surrounding polygon is getting larger according to the supplied error distance. The magnitude of the supplied error size depends on the application.

The sequence in FIGS. 3(a)–(g) shows the effect of a decreasing error parameter, by having polygon 504 increasingly matching the contours of the "mother and daughter" sequence. For example, in (g) the error is considered to be 0. A similar sequence, with similar decreasing error parameters is shown in FIGS. 4(a)–(f), where in (f) the error is considered to be 0. In FIG. 4, the player seems to have four different segments, i.e. a shirt 520, short pants 522, a head 524 and a hand 526, but semantically, these four different segments belong to a single object defined by a boundary (contour) 530.

Different applications may have different error parameter requirements. For example, for adaptive bit allocation for compression, the error should be above 0. Otherwise, adaptive bit allocation with more bits on the objects will have strong visible boundary effects. For interactive TV applications, the error is assumed to be 0.

The second task is filling all the missing points of the polygons that surround the extracted objects, since, typically, thresholding step 36 generates a bounding contour composed of polygons that may have missing pixels (fragmented boundaries). The second task is preferably accomplished by a region-growing substep. The following describes a preferred embodiment of the algorithm for the process of region-growing, by which we obtain the minimal static segment that contains a moving object, from the initial, connected component of the object. We typically and preferably operate on the RGB components of the frame. However, the algorithm can also operate with one gray level component.

An exemplary region-growing algorithm operates as follows: in every connected component of a number of pixels, we look for a pixel on the contour that minimizes a distance that we define later. We unite this pixel with the rest of the connected component while we generate a new modified contour of the object. After this operation is completed, we have a new center of gravity of the object that we have to compute again, according to a predefined function, and we update the relevant fields in the data structure. We repeat this operation until there is no other pixel that satisfies the definitions of the homogeneity of the object.

In order to generate partition of the image into homogenous regions, we start with some initial anchor points that we can find from computation of the local maximum of the histogram of the image. The next section describes the step-by-step complete process flow of a preferred region-growing algorithm implementation:

1. Label each image pixel as a separate region, and set the global criterion (explained below) value, critval, equal to zero.
2. Calculate the dissimilarity criterion (explained below) value between each spatially adjacent region.
3. Find the smallest dissimilarity criterion value, and merge all pairs of spatially adjacent regions with this criterion value.
4. Calculate the dissimilarity criterion value between all pairs of non-spatially adjacent regions.
5. Merge all pairs of non-spatially adjacent regions with a dissimilarity criterion value less than or equal to the criterion value found in step 3.
6. If the number of regions remaining is less than the preset value minregions, go to step 7. Otherwise go to step 2.
7. Let prevcritval=critval. Reset critval to be the current global criterion value. If prevcritval=zero, go to step 2. Otherwise calculate cvratio=critval/prevcritval. If cvratio is greater than the preset threshold convfact, save the region label map from the previous iteration as a "raw" segmentation result. If the number of regions remaining is two or less, save the region label map from the current iteration as the coarsest instance of the final hierarchical segmentation result, and go to step 8. Otherwise go to step 2.
8. Calculate the global criterion value over each region separately. For the region with a maximum global criterion value, search backwards from the last "raw" segmentation result (from step 7) to an iteration where this region is split into two or more regions. Replace the labeling for this region with the labeling from the found iteration and store as the next more detailed level of the final hierarchical segmentation. Repeat this step until the preset number of levels in the final hierarchical segmentation is obtained.

Dissimilarity Criterion: For two regions i and j, characterized by the mean vectors $X_i=(x_{1i}, x_{2i}, \ldots, x_{ci})^T$ and $X_j=(x_{1j}, x_{2j}, \ldots, x_{cj})^T$, the Euclidean (ESD) is defined as:

$$ESD_{ij} = \left[\sum_{k=1}^{c}(x_{ki} - x_{kj})^2\right]^{\frac{1}{2}} \tag{15}$$

where c is the number of spectral channels.

Global Criterion: The global criterion is used to identify significant changes in the segmentation results from one iteration to the next. This criterion is the same as the dissimilarity criterion, except that it compares the original image data with the region mean image from the present segmentation. The value of this criterion is calculated at each image point, and averaged over the entire image. The global criterion is also used to select which region is to be split in the final, backtracking stage of the algorithm. In this case the value of this criterion is calculated at each image point in the region under consideration, and is averaged over that region.

When there is a point that belongs to the object, we preferably perform interpolation to get the contour. A line on the edge of an object, which is characterized by the same attributes (such as k-means, distance, Hough) becomes a point, and each line becomes a point.

After we identified the objects in step 36 in FIG. 1, a binary image $I_{12}^D$ bin 40 is then generated using this threshold, image 40 showing the location of each object in the frame. Each object in binary image 40 has a bounding contour composed of polygons that may have missing pixels (i.e. fragmented boundaries). A missing-point filling (or boundary re-unifying) step 42 is then performed to fill the missing pixels on each polygon. A preferred procedure that fills the missing parts of the polygon is described next: we choose the lowest real point on the polygon that was derived in the previous step. We take the perpendicular line of the lowest pixel. Then we draw a line after line in a clockwise direction till we hit another existing pixel on the polygon. This way we reach all the existing points on the polygon, till we get to the place where there are missing point or points.

We apply again the clock algorithm. We draw line by line in a clockwise manner, till the last application of the line hits a real polygon. This way we derive the line of the polygon that goes through the missing points.

Case II: The reading of the two consecutive video frames is done as was described in before in step 26. Next, we perform reciprocal illumination correction step 28', identical with step 28. The results are smoothed frames (outputs) $I_1^c$ and $I_2^c$. In parallel with step 28', and unlike in Case I, an edge detection step 48 is applied on $I_1$ to produce a first edge image $I_1^E$. Edge detection 48 is preferably carried out using either Canny or Sobel algorithms. Next, a statistical model-based "change detection" step 30' identical with step 30 is applied between smoothed frames $I_1^c$ and $I_2^c$. This generates a difference image or output (in float) $I_{12}^D$ 34', that shows moving objects. Next, a global adaptive thresholding step 50 is applied on $I_1^E$ that was obtained from edge detection 48. Unlike step 36 in case I, global thresholding 50 does not include region-growing. This global thresholding step is another novel, non-obvious step according the present invention, and a preferred algorithm used to perform it is described next.

We find the global threshold preferably in the following way: we divide initially the image into some arbitrary parts, and then refine the initial guess of these parts by an iterative computation, till we reach a final "correct threshold". When we are given a gray level image $I_1^E$, the following algorithm returns a value that is the segmentation threshold value that allows us to perform the initial segmentation.

1. We choose an initial threshold. This is typically a guess. For example, this initial threshold can be the average of the four corners of the pixel values of the image $I_1^E$. Preferably, the corner is composed of 6×6 pixels. This initial guess is denoted by $T_0$. Let $t=T_0$.

2. We compute the average of the gray levels of all pixels that are below t and get a new threshold. The new threshold is assigned to $T_0$.

3. We compute the average of the gray levels of all pixels that are above t. This average is denoted by $T_b$. We get a new threshold $$t = \frac{T_0 + T_b}{2}.$$

The process is repeated till we get in two consecutive frames the same threshold. This value is passed to the next algorithm.

If we start with initial guess $T_0$ then in the $k^{th}$ step we get a k-threshold $T_k$ which is:

$$T_k = \frac{\sum_{i=0}^{T_{k-1}} ih(i)}{2\sum_{i=0}^{T_{k-1}} h(i)} + \frac{\sum_{j=T_{k-1}+1}^{N} jh(j)}{2\sum_{j=T_{k-1}+1}^{N} h(j)} \quad (16)$$

where k=1, . . . , N, N is the number of pixels, and h is the histogram of the binary image that is determined by the threshold $T_k$. When $T_k=T_{k+1}$, the iterative process is terminated and the k-threshold $T_k$ is the output of the thresholding operation 36. If this equality is not reached, we return to step 2. We therefore get a binary image in which the pixels are divided to those above or below $T_k$. Above $T_k$ they are marked as 1, otherwise they are 0. This iterative method is not based only on the histogram (gray level values) but also takes into consideration the geographic location of the pixels.

From thresholding step 50 we get a binary image using the threshold $T_k$. In this binary image we identify the suspected objects as moving connected components. The output of global adaptive thresholding step 50 is first binary image $I_1^{bin\,E_1}$ which is fed into an AND gate together with image $I_{12}^D$ 34' for an ANDing operation 66, which is an additional operation unique to Case II, and yet another novel, non-obvious step of the method of the present invention. We assume that the frames/images are of the same size (number of pixels and arrangement in a 2-D plane). The AND operates on the same pixel from both images, i.e. it takes a pixel (i,j) from one image ($I_1^{bin\,E_1}$), and an identically located (same) pixel (i,j) from the other image ($I_{12}^D$) and applies the AND on both. This is done to all pixels in both images. This produces an image where any pixel with a value 0 in binary image $I_1^{bin\,E_1}$ also becomes 0 in difference image $I_{12}^D$. Otherwise, a pixel in the difference image $I_{12}^D$ stays as is. The output of ANDing step 66 is fed into local adaptive thresholding 36, and from here the algorithm proceeds as in Case I.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for automatic extraction of objects in video sequences, each object represented by an array of pixels, the method comprising:
    a. providing at least a first and a second high frame rate video frames;
    b. performing a reciprocal illumination correction of said first and second video frames to yield respective first and second smoothed frames;
    c. performing a change detection operation between said first and second smoothed frames to obtain a difference image; and
    d. performing a local adaptive thresholding operation on said difference image to generate a binary image containing extracted objects, said local thresholding operation using a weight test to determine a boundary of each of said extracted objects, whereby the extraction of said extracted objects by the method is automatic stable and robust, and whereby no advance knowledge of the video sequences is needed to achieve the extraction.

2. The method of claim 1, wherein said first and second video frames are colored video frames, and wherein said step of providing at least a first and a second video frames is preceded by a logical test for said high frame rate, said logical test checking whether said high rate is at least fifteen frames per second.

3. The method of claim 1, wherein said step of reciprocal illumination correction includes the application of a low pass filter on each of said first and second video frames.

4. The method of claim 3, wherein said low pass filter is selected from the group consisting of bilateral, Gaussian, non-decimated scaling wavelet and spline filters.

5. The method of claim 1, wherein said step of reciprocal illumination correction further includes normalization of pixel values of said first and second smoothed frames.

6. The method of claim 5, wherein said normalization further includes a pixel-by-pixel division of said first and second smoothed frames by respectively said first and second video frames.

7. The method of claim 1, wherein said step of performing a change detection operation includes performing a statistical model-based change detection.

8. The method of claim 1, wherein said step of performing a local adaptive thresholding operation further includes the substep of using the pixels as seeds for a search operation resulting in the determination of said boundary.

9. The method of claim 1, wherein said boundary is fragmented, said method further comprising re-unifying said fragmented boundary.

10. The method of claim 9, wherein said step of performing a local adaptive thresholding further includes performing a region-growing operation.

11. The method of claim 1, wherein said weight test use includes checking for a monotonic change in said weight, said change showing a monotonic increase for pixels inside said boundary, and a monotonic decrease leading to a plateau in said weight for pixels outside said boundary.

12. The method of claim 11, wherein said step of re-unifying is carried out using a contour extraction algorithm.

13. A method for automatic extraction of objects in video sequences, each object represented by an array of pixels, the method comprising:
   a. providing at least a first and a second low frame rate video frames;
   b. performing a reciprocal illumination correction of said first and second video frames to yield respective first and second smoothed frames;
   c. performing an edge detection operation on said first video frame to produce a first edge image;
   d. performing a change detection operation between said first and second smoothed frames to obtain a difference image;
   e. performing a global thresholding operation on said first edge image to produce a first binary edge image;
   f. ANDing said difference image and said first binary edge image to produce a first edge-corrected difference image; and
   g. performing a local adaptive thresholding operation on said first edge-corrected difference image to generate a second binary image containing extracted objects, said local thresholding operation using a weight test to determine a boundary of each of said extracted objects,
whereby the extraction of said extracted objects by the method is automatic, stable and robust, and whereby no advance knowledge of the video sequences is needed to achieve the extraction.

14. The method of claim 13, wherein said first and second video frames are colored video frames, and wherein said step of providing at least a first and a second low frame rate video frames is preceded by a logical test for said low frame rate, said logical test checking whether said low rate is less than fifteen frames per second.

15. The method of claim 13, wherein said step of reciprocal illumination correction includes the application of a low pass filter on each of said first and second video frames.

16. The method of claim 15, wherein said low pass filter is selected from the group consisting of bilateral, Gaussian, non-decimated scaling wavelet and spline filters.

17. The method of claim 13, wherein said step of reciprocal illumination correction further includes normalization of pixel values of said first and second smoothed frames.

18. The method of claim 17, wherein said normalization includes a pixel-by-pixel division of said first and second smoothed frames by respectively said first and second video frames.

19. The method of claim 13, wherein said step of performing a change detection operation includes performing a statistical model-based change detection.

20. The method of claim 13, wherein said step of performing a global thresholding operation on said first edge image includes: iteratively:
   i. choosing an initial threshold based on a first average of gray level values of a group of pixels in the image;
   ii. computing a new threshold based on a second average of all gray level values that are below said initial threshold, and assigning said new threshold to said initial threshold to get a modified threshold;
   iii. computing a third average of all gray level values that are above said initial threshold, and averaging said third average with said modified threshold to get a modified new threshold;
   iv. comparing said modified new threshold with said modified threshold; and
   v. assigning said modified new threshold to said modified threshold if said modified new and modified thresholds are not equal, and continuing a looping procedure until said modified new threshold and said modified threshold are equal.

21. The method of claim 13, wherein said boundary is fragmented, said method further comprising re-unifying said fragmented boundary.

22. The method of claim 21, wherein said step of performing a local adaptive thresholding further includes performing a region-growing operation.

23. The method of claim 13, wherein said weight test use includes checking for a monotonic change in said weight, said change showing a monotonic increase for pixels inside said boundary, and a monotonic decrease leading to a plateau in said weight for pixels outside said boundary.

24. The method of claim 23, wherein said step of re-unifying is carried out using a contour extraction algorithm.

25. A method for automatic extraction of objects in color video sequences, each object represented by an array of pixels, the method comprising:
   a. providing at least a first and a second high frame rate video frames;
   b. obtaining a first edge image of said first video frame;
   c. obtaining a difference image based on first and second illumination corrected, smoothed frames derived from said first and second video frames respectively;
   d. performing a global thresholding operation on said first edge image to produce a first binary edge image;
   e. ANDing said difference image and said first binary edge image to produce a first edge-corrected difference image; and
   f. based on said first edge-corrected difference image, generating a second binary image containing extracted objects,
whereby the extraction of said extracted objects by the method is automatic, stable and robust, and whereby no advance knowledge of the video sequences is needed to achieve the extraction.

* * * * *